US010423898B2

(12) United States Patent
Fansler et al.

(10) Patent No.: US 10,423,898 B2
(45) Date of Patent: Sep. 24, 2019

(54) STATISTICAL MODELING AND ANALYSIS OF FUEL-RELATED FACTORS IN TRANSPORTATION INDUSTRIES

(75) Inventors: Thomas S. Fansler, Plymouth, MN (US); Ronald Edward Konezny, Shorewood, MN (US)

(73) Assignee: Trimble Navigation Limited, Sunnyvale, CA (US)

( * ) Notice: Subject to any disclaimer, the term of this patent is extended or adjusted under 35 U.S.C. 154(b) by 2247 days.

(21) Appl. No.: 13/342,174

(22) Filed: Jan. 2, 2012

(65) Prior Publication Data
US 2012/0209579 A1 Aug. 16, 2012

Related U.S. Application Data

(60) Provisional application No. 61/429,089, filed on Dec. 31, 2010.

(51) Int. Cl.
*G06Q 10/04* (2012.01)

(52) U.S. Cl.
CPC .................................. *G06Q 10/04* (2013.01)

(58) Field of Classification Search
CPC ...................................................... G06Q 10/04
See application file for complete search history.

(56) References Cited

U.S. PATENT DOCUMENTS

| 2006/0089785 A1* | 4/2006 | Sato ........................ G01F 9/023 701/123 |
| 2011/0270486 A1* | 11/2011 | Stevens .................. G06Q 10/04 701/31.4 |

OTHER PUBLICATIONS

Wang et al., "Modelling of the fuel consumption for passenger cars regarding driving characteristics", Transportation Research Part D: Transport and Environment, vol. 13, Issue 7, Oct. 2008, pp. 479-482.*
StatCrunch, "The Relationship Between a car's Weight and MPG", Mar. 2010, https://www.statcrunch.com/5.0/viewreport.php?reportid=12692.*
Danowitz, "Gas Guzzler Weights", Oct. 24, 2010, http://large.stanford.edu/courses/2010/ph240/danowitz1/.*

* cited by examiner

*Primary Examiner* — Saif A Alhija
(74) *Attorney, Agent, or Firm* — Hollingsworth Davis, LLC

(57) ABSTRACT

Techniques involving modeling and analysis of operational metrics in transportation industries are disclosed. Representative methods involve defining a set of fuel consumption performance factors having a potential to impact vehicle fuel economy. Fuel consumption performance factors are received, and categorical variables are identified from at least a subset of the fuel consumption performance factors to create one or more categorical groupings. The fuel consumption performance factors associated with at least one of the categorical groupings are processed to identify a hypothetical maximum fuel economy or "baseline" for the at least one of the categorical groupings, and to identify fuel economy deduction coefficients based on the fuel consumption performance factors that adversely impact the hypothetical maximum fuel economy. Models are created based on the hypothetical maximum fuel economy and the fuel economy deduction coefficients to predict fuel economy for vehicles in the at least one of the categorical groupings.

19 Claims, 17 Drawing Sheets

FIG. 5

| DATA SOURCE | PROCESSES | MODEL DATA TYPE | ROLE IN MODEL DEVELOPMENT |
|---|---|---|---|
| CLIENT ERP "DISPATCH" SOFTWARE PLATFORM | | | |
| EQUIPMENT MASTER (VEHICLE ID, MAKE, MODEL, YEAR...) | IMPORT & VALIDATE (I+V) | CATEGORICAL VARIABLE | CATEGORICAL VARIABLES ARE ANALYZED TO FIND STATISTICALLY SIMILAR GROUPS (VAN VS. REEFER / OVER-THE-ROAD VS. LOCAL / CUMMINS VS. DETROIT ENGINES, ETC.) FOR MODELING PURPOSES |
| VEHICLE IDENTIFICATION NUMBER (VIN) | I+V -> USE VIN DECODER TO STANDARIZE FIELDS | CATEGORICAL VARIABLE | |
| COMPANY INFO: (DIVISION, COST CENTER FREIGHT TYPE) | | CATEGORICAL VARIABLE | |
| EMPTY/LOADED STATUS | I+V -> USE VIN DECODER TO STANDARIZE FIELDS | CATEGORICAL VARIABLE | CONTINUOUS "VIRTUAL" VARIABLES ARE USED TO GENERATE MODEL COEFFICIENTS WITHIN EACH OF THE STATISTICALLY SIGNIFICANT CATEGORICAL GROUPINGS IDENTIFIED ABOVE. EACH MODEL PROVIDES A MECHANISM FOR PREDICTING FUEL CONSUMPTION & MPG FOR EACH UNIT (VEHICLE OR DRIVER) BASED ON THE UNIT'S INDIVIDUAL ACTIVITIES (VARIABLES). DISPATCH, ECM, AND OER, I.E., CAN BE DESCRIBED AS "VIRTUAL" DATA SOURCES BECAUSE THEY INVOLVE ESTIMATED REPRESENTATIONS OF PHYSICAL TRAVEL AND FUEL CONSUMPTION. THESE "VIRTUAL" REPRESENTATIONS DEVIATE FROM THE PHYSICAL VARIABLES IN A NON-UNIFORM MANNER. THESE VARIANCES BETWEEN "VIRTUAL" AND "PHYSICAL" ARE ACCOUNTED FOR BELOW. |
| LOAD WEIGHT | I+V -> USE VIN DECODER TO STANDARIZE FIELDS | CATEGORICAL VARIABLE | |
| ELECTRONIC ENGINE OR "ECM" | | | |
| IDLE TIME / IDLE GALLONS | I+V | CONTINUOUS VARIABLE | |
| SPEED & RPM METRICS | I+V | CONTINUOUS VARIABLE | |
| MILES, FUEL, ELECTRONIC MPG | I+V | CONTINUOUS VARIABLE | |
| ONBOARD EVENT RECORDERS | | | |
| HARD BRAKING | I+V | CONTINUOUS VARIABLE | |
| RAPID STARTS | I+V | CONTINUOUS VARIABLE | |
| FUEL PURCHASE HISTORY | | | |
| ELECTRONIC FUEL PURCHASES | I+V | CONTINUOUS VARIABLE - PHYSICAL FUEL | CONTINUOUS "PHYSICAL" VARIABLES MAY BE USED AS THE "Y" OR "LEFT-SIDE" VARIABLE. THEY CAN ALSO BE USED TO CORRECT FOR VARIANCES (BIAS) BETWEEN A *VIRTUAL* MODEL'S ESTIMATED FUEL CONSUMPTION AND ACTUAL *PHYSICAL* FUEL CONSUMPTION. THIS ALLOWS MODEL (PREDICTED) FUEL CONSUMPTION TO NET OUT AGAINST PHYSICAL CONSUMPTION. |
| CASH FUEL PURCHASES | CAPTURED THROUGH WEBSITE | CONTINUOUS VARIABLE - PHYSICAL FUEL | |
| GPS/MOBILE COMMUNICAITONS SYSTEMS | | | |
| GPS POSITION HISTORY | I+V -> CALCULATE ROUTE OF TRAVEL, MILES | CONTINUOUS VARIABLE - PHYSICAL MILES | |
| ODOMETER HISTORY | I+V -> CALCULATE MILES TRAVELED | CONTINUOUS VARIABLE - PHYSICAL MILES | |

EXCESS FUEL CALCULATION - TRACTOR 12345

UNITS: MILES/GALLONS
TANK CAPACITY: 200
MIN TANK RESIDUAL: 20 — 1004
ECM MPG: 6.53 — 1006

DETECTION THRESHOLD: 25
ECM MPG CORRECTION FACTOR: 0.96 — 1002

| PURCHASE DATE | PURCHASE QUANTITY | MILES TO NEXT PURCHASE | FUEL USED TO NEXT PURCHASE | STARTING LEVEL | ADJUSTED STARTING LEVEL | ENDING LEVEL | ADJUSTED ENDING LEVEL | FINDINGS |
|---|---|---|---|---|---|---|---|---|
| 2/1/2010 5:36:00 PM | 60.5 | 775.1 | 118.1 | 80.5 | 80.5 | -38.3 | 20.0 | |
| 2/2/2010 7:11:00 PM | 118.5 | 1122.6 | 172.0 | 138.5 | 138.5 | -33.5 | 20.0 | |
| 2/5/2010 6:21:00 AM | 50.0 | 346.8 | 53.1 | 70.0 | 70.0 | 16.9 | 20.0 | |
| 2/5/2010 1:41:00 PM | 50.1 | 205.1 | 31.4 | 70.1 | 70.1 | 38.7 | 38.7 | |
| 2/6/2010 6:02:00 AM | 50.0 | 314.8 | 48.2 | 88.7 | 88.7 | 40.4 | 40.4 | |
| 2/6/2010 6:02:00 PM | 50.0 | 153.8 | 23.6 | 90.4 | 90.4 | 66.9 | 66.9 | |
| 2/7/2010 11:39:00 AM | 135.3 | 737.5 | 113.0 | 202.2 | 200.0 | 87.0 | 87.0 | Full tank |
| 2/9/2010 6:45:00 AM | 97.0 | 658.0 | 100.8 | 184.0 | 184.0 | 83.2 | 83.2 | |
| 2/10/2010 7:56:00 PM | 117.0 | 754.0 | 115.5 | 200.2 | 200.0 | 84.5 | 84.5 | |
| 2/12/2010 10:31:00 AM | 154.6 | 725.5 | 111.2 | 239.1 | 200.0 | 88.8 | 88.8 | excess (39.1) |
| 2/19/2010 1:08:00 PM | 50.3 | 294.6 | 45.1 | 139.1 | 139.1 | 94.0 | 94.0 | |
| 2/19/2010 8:03:00 PM | 128.7 | 828.0 | 126.9 | 222.7 | 200.0 | 73.1 | 73.1 | |
| 2/21/2010 12:33:00 PM | 120.6 | 877.2 | 134.4 | 193.7 | 193.7 | 59.3 | 59.3 | |
| 2/23/2010 7:55:00 PM | 107.3 | 486.2 | 74.5 | 166.6 | 166.6 | 92.1 | 92.1 | |
| 2/25/2010 8:57:00 AM | 61.2 | 548.7 | 84.1 | 153.3 | 153.3 | 69.2 | 69.2 | |
| 2/26/2010 10:16:00 AM | 127.0 | 830.0 | 127.2 | 196.2 | 196.2 | 69.1 | 69.1 | |
| 2/27/2010 4:16:00 PM | 70.3 | 544.9 | 83.5 | 139.4 | 139.4 | 55.9 | 55.9 | |

*FIG. 10*

ABCXYZ CARRIER CORP
PERIOD: 6/1/2010 - 6/30/2010

ABCXYZ CARRIER CORP

MISSING FUEL CALCULATION - TRACTOR 12345

PREPARED: 8/30/2010
PAGE 1 OF 1

UNITS: MILES/GALLONS
TANK CAPACITY: 200
MIN TANK RESIDUAL: 20
ECM MPG: 6.18

DETECTION THRESHOLD: 25
ECM MPG CORRECTION FACTOR: 0.97

| PURCHASE DATE | PURCHASE QUANTITY | MILES TO NEXT PURCHASE | FUEL USED TO NEXT PURCHASE | STARTING LEVEL | ADJUSTED STARTING LEVEL | ENDING LEVEL | ADJUSTED ENDING LEVEL | FINDINGS |
|---|---|---|---|---|---|---|---|---|
| 6/4/2010 12:35 AM | 107.1 | 1092.5 | 176.7 | 200.0 | 200.0 | 3.3 | 20.0 | |
| 6/5/2010 11:59:00 PM | 162.8 | 619.4 | 100.2 | 182.8 | 182.8 | 82.6 | 82.6 | |
| 6/7/2010 9:01:00 PM | 50.4 | 516.3 | 83.5 | 133.0 | 133.0 | 49.6 | 49.6 | |
| 6/8/2010 4:24:00 PM | 132.9 | 896.7 | 145.0 | 182.5 | 182.5 | 37.5 | 37.5 | |
| 6/10/2010 12:23:00 AM | 140.8 | 293.4 | 47.4 | 178.3 | 178.3 | 130.8 | 130.8 | |
| 6/12/2010 7:41:00 PM | 70.2 | 680.1 | 110.0 | 201.0 | 200.0 | 90.0 | 90.0 | FULL TANK |
| 6/14/2010 1:46:00 AM | 94.2 | 649.8 | 105.1 | 184.2 | 184.2 | 79.2 | 79.2 | |
| 6/15/2010 3:01:00 AM | 80.1 | 809.0 | 130.8 | 159.3 | 159.9 | 28.5 | 28.5 | |
| 6/16/2010 3:30:00 PM | 129.3 | 724.5 | 117.1 | 157.8 | 157.8 | 40.6 | 40.6 | |
| 6/17/2010 9:03:00 PM | 119.1 | 270.4 | 43.7 | 159.7 | 159.7 | 116.0 | 116.0 | |
| 6/19/2010 3:11:00 PM | 46.2 | 677.0 | 109.5 | 162.2 | 162.2 | 52.7 | 52.7 | |
| 6/20/2010 1:26:00 PM | 97.2 | 920.6 | 148.9 | 149.9 | 149.9 | 1.1 | 20.0 | |
| 6/21/2010 6:05:00 PM | 126.3 | 675.0 | 109.1 | 146.3 | 146.3 | 3702 | 37.2 | |
| 6/22/2010 7:30:00 PM | 84.2 | 592.1 | 95.7 | 121.4 | 121.4 | 25.6 | 25.6 | |
| 6/24/2010 2:47:00 PM | 81.1 | 551.6 | 89.2 | 106.7 | 106.7 | 17.5 | 20.0 | |
| 6/26/2010 9:16:00 PM | 91.5 | 904.6 | 146.3 | 111.5 | 111.5 | -34.8 | 20.0 | MISSING (54.8) |
| 6/28/2010 3:14:00 PM | 142.2 | 0.0 | 0.0 | 162.2 | 162.2 | 162.2 | 162.2 | |

*FIG. 11*

VEHICLE REPORTING - NONPERFORMING VEHICLES

| Tractor | Model | Period Start | Period End | Fuel Tax MPG | ECM MPG | AVG MPG | Model MPG | Avg - Model MPG | Extra Fuel | Cost | View Data | Status | Notes |
|---|---|---|---|---|---|---|---|---|---|---|---|---|---|
| 9634 | Reef-1 | 2/1/2010 | 2/28/2010 | 5.36 | 5.34 | 5.36 | 6.07 | -0.71 | 165.6 | $452.20 | Data | Needs Review | Notes |
| 9702 | Reef-1 | 2/1/2010 | 2/28/2010 | 5.55 | 5.64 | 5.60 | 6.32 | -0.72 | 133.3 | $367.88 | Data | Action Taken | Notes * |
| 9818 | Van-1 | 2/1/2010 | 2/28/2010 | 5.25 | 5.21 | 5.23 | 6.25 | -1.02 | 234.2 | $611.35 | Data | Under Review | Notes * |
| 9880 | Reef-2 | 2/1/2010 | 2/28/2010 | 5.68 | 5.76 | 5.72 | 6.51 | -0.8 | 170.8 | $445.79 | Data | Action Needed | Notes * |
| 9911 | Reef-1 | 2/1/2010 | 2/28/2010 | 5.23 | 5.19 | 5.21 | 6.06 | -0.85 | 149.7 | $390.71 | Data | Needs Review | Notes |
| 9957 | Reef-1 | 2/1/2010 | 2/28/2010 | 5.51 | 5.59 | 5.55 | 6.31 | -0.77 | 134 | $349.64 | Data | No Action Needed | Notes * |
| 10001 | Van-1 | 2/1/2010 | 2/28/2010 | 5.34 | 5.30 | 5.32 | 6.11 | -0.79 | 283.5 | $740.02 | Data | No Action Needed | Notes * |
| 10211 | Reef-2 | 2/1/2010 | 2/28/2010 | 5.49 | 5.57 | 5.53 | 6.49 | -0.96 | 183.9 | $479.91 | Data | Under Review | Notes * |
| 10260 | Reef-1 | 2/1/2010 | 2/28/2010 | 5.41 | 5.37 | 5.39 | 6.35 | -0.96 | 211.8 | $552.76 | Data | Action Taken | Notes * |
| 10269 | Reef-1 | 2/1/2010 | 2/28/2010 | 5.38 | 5.46 | 5.42 | 6.23 | -0.81 | 262.7 | $685.66 | Data | Needs Review | Notes |
| 10673 | Van-1 | 2/1/2010 | 2/28/2010 | 5.26 | 5.22 | 5.24 | 6.03 | -0.79 | 183.1 | $477.77 | Data | Under Review | Notes * |
| 11728 | Reef-2 | 2/1/2010 | 2/28/2010 | 5.67 | 5.75 | 5.71 | 6.69 | -0.97 | 170.3 | $444.36 | Data | Action Taken | Notes * |

FIG. 12

UNITS: MILES/GALLONS

MPG: 6.326

FILTERS: IFTA-REPORTABLE

FUEL TAX SUMMARY

PAGE 1 OF 1

| STATE | TOTAL MILES | GALLONS CONSUMED | PUMP TAX | OFF-PUMP TAX | TAX DUE | PURCHASED GALLONS | TAX PAID GALLONS | PUMP TAX PAID | NET TAX DUE/(RFND) |
|---|---|---|---|---|---|---|---|---|---|
| AB | 0.0 | 0.0 | 0.3217 | | $0.00 | 0.0 | 0.0 | $0.0 | $0.0 |
| AL | 78120.1 | 12348.7 | 0.1900 | | $2346.25 | 7506.9 | 7506.9 | $1426.31 | $919.94 |
| AR | 87722.4 | 13866.5 | 0.2250 | | $3119.97 | 20144.2 | 20144.2 | $4532.31 | ($1412.48) |
| AZ | 28400.6 | 4489.4 | 0.2600 | | $1167.23 | 1425.5 | 1425.5 | $370.63 | $796.60 |
| BC | 0.0 | 0.0 | 0.6732 | | $0.00 | 0.0 | 0.0 | $0.00 | $0.0 |
| CA | 46523.8 | 7354.1 | 0.3730 | | $2743.10 | 8203.8 | 8203.8 | $3060.02 | ($316.92) |
| CO | 25784.1 | 4075.8 | 0.2050 | | $835.53 | 3798.6 | 3798.6 | $778.71 | $56.82 |
| CT | 11729.8 | 1854.2 | 0.4510 | | $836.23 | 827.4 | 827.4 | $373.16 | $463.07 |
| DC | 7.7 | 1.2 | 0.0000 | | $0.00 | 0.0 | 0.0 | $0.00 | $0.0 |
| DE | 1962.0 | 310.1 | 0.2200 | | $68.23 | 0.0 | 0.0 | $0.00 | $68.23 |
| FL | 49821.9 | 7875.5 | 0.3157 | | $2494.17 | 6341.3 | 6341.3 | $2008.29 | $485.88 |
| GA | 168758.9 | 26676.2 | 0.1500 | | $4001.43 | 12390.8 | 12390.8 | $1859.62 | $2142.81 |
| IA | 85962.9 | 13588.4 | 0.2250 | | $3057.39 | 12351.6 | 12351.6 | $2779.11 | $278.28 |
| ID | 11246.5 | 1777.8 | 0.2500 | | $444.44 | 602.3 | 602.3 | $150.58 | $293.87 |
| IL | 206884.5 | 32702.8 | 0.3500 | | $11445.99 | 21396.6 | 21396.6 | $7488.81 | $3957.18 |
| IN | 173505.3 | 27426.5 | 0.1600 | 0.1100 | $7405.15 | 26056.5 | 26056.5 | $4169.04 | $3236.11 |
| KS | 59683.5 | 9434.3 | 0.2600 | | $2452.93 | 3060.4 | 3060.4 | $795.70 | $1657.22 |
| KY | 115414.3 | 18243.9 | 0.1970 | 0.0920 | $5272.48 | 4666.1 | 4666.1 | $919.22 | $4353.26 |
| LA | 44122.7 | 5974.6 | 0.2000 | | $1394.92 | 9970.9 | 9970.9 | $1994.18 | ($599.26) |
| MA | 4770.1 | 754.0 | 0.2100 | | $158.34 | 628.2 | 628.2 | $131.92 | $26.42 |

*FIG. 14*

STATISTICAL MODELING AND ANALYSIS
OF FUEL-RELATED FACTORS IN
TRANSPORTATION INDUSTRIES

RELATED APPLICATIONS

This application claims the benefit of Provisional Patent Application No. 61/429,089, filed on Dec. 31, 2010, to which priority is claimed pursuant to 35 U.S.C. § 119(e) and which is incorporated herein by reference in its entirety.

SUMMARY

Embodiments described in this disclosure are generally directed to methods and apparatuses for modeling and analyzing operational metrics in transportation industries. According to embodiments described herein, methods of the disclosure involve defining a set of fuel consumption performance factors having a potential to impact vehicle fuel economy. Fuel consumption performance factors are received, and categorical variables are identified from at least a subset of the fuel consumption performance factors to create one or more categorical groupings. The fuel consumption performance factors associated with at least one of the categorical groupings are processed to identify a hypothetical maximum fuel economy or "baseline" for the at least one of the categorical groupings, and to identify fuel economy deduction coefficients based on the fuel consumption performance factors that adversely impact the hypothetical maximum fuel economy. Models are created based on the hypothetical maximum fuel economy and the fuel economy deduction coefficients to predict fuel economy for vehicles in the at least one of the categorical groupings.

In other embodiments, an apparatus includes a communications module configured to receive data concerning vehicle actions impacting fuel economy, a processor, and storage coupled to the processor. Program modules are stored in the storage and are executable by the processor. A data input module is configured to receive and parse the received data, and a data integration module prepares the data for processing. A data modeling module is configured to create data models based on the data to arrive at a predictive fuel consumption rate based on factors obtained from the prepared data. An analysis model is configured to apply the data models to provide analyses of expected fuel consumption versus actual fuel consumption in view of the data models.

In other embodiments methods involve identifying fuel consumption impacting factors for a category of vehicles, and calculating an expected fuel consumption for a particular vehicle in the category of vehicles based on the identified fuel consumption impacting factors. Actual vehicle operational data is received from at least one remote data source. Actual fuel consumption is calculated for the vehicle based on the collected actual vehicle operational data, and the calculated actual fuel consumption and the expected fuel consumption can be compared.

This summary introduces representative concepts that are further described in the ensuing description. The summary is not intended to identify essential features of current or future claimed subject matter, nor is it intended to be used to limit the scope of the claimed subject matter.

BRIEF DESCRIPTION OF THE DRAWINGS

FIG. 5 is a table illustrating particular examples of data arriving from the various data sources, and how they may be employed in the data models;

FIG. 10 illustrates tabular results of an excess fuel calculation;

FIG. 11 illustrates tabular results of a missing fuel calculation;

FIG. 12 illustrates a report 1200 from an analysis of underperforming vehicles;

FIG. 14 is an example of a report based on data received from one or more data sources.

DETAILED DESCRIPTION

In the following description, reference is made to the accompanying drawings that depict representative implementation examples. It is to be understood that other embodiments and implementations may be utilized, as structural and/or operational changes may be made without departing from the scope of the disclosure.

The disclosure is generally directed to analysis of operational metrics in transportation industries. While the disclosure is directed primarily to trucks and fleets of trucks, the principles described herein are equally applicable to any vehicles in which fuel or other energy sources are expended.

Implementations may be used in connection with vehicles ranging from a single vehicle to large fleets of vehicles having different characteristics. Data associated with the vehicles can be gathered in numerous ways, and durable data models may be created to reduce or eliminate operational costs associated with a variety of transportation-related considerations including, but not limited to, the performance of drivers, performance of equipment, misaligned fuel surcharges, fuel theft, missing fuel, unreported fuel purchases, state miles, etc. The data models may serve as predictive fuel models from which driver performance, equipment performance and/or other factors can be monitored and analyzed for operational performance review and improvement.

Data for use in the modeling and analysis is received from, for example, the vehicles, third party vendors, and/or mobile communications companies. Data fields are reviewed, such as through evaluation of data quality and usability, identification of missing or irregular values, and the creation of uniform values. A statistical analysis can be executed, where significant categorical variables are identified, such as equipment type, fleet type, division, etc. A model with costing elements may be created. For example, a model for each significant categorical variable may be generated, and the model may be applied to operational metrics process for items such as fuel theft, non-performing vehicles, driver alerts, etc.

Figure 1:
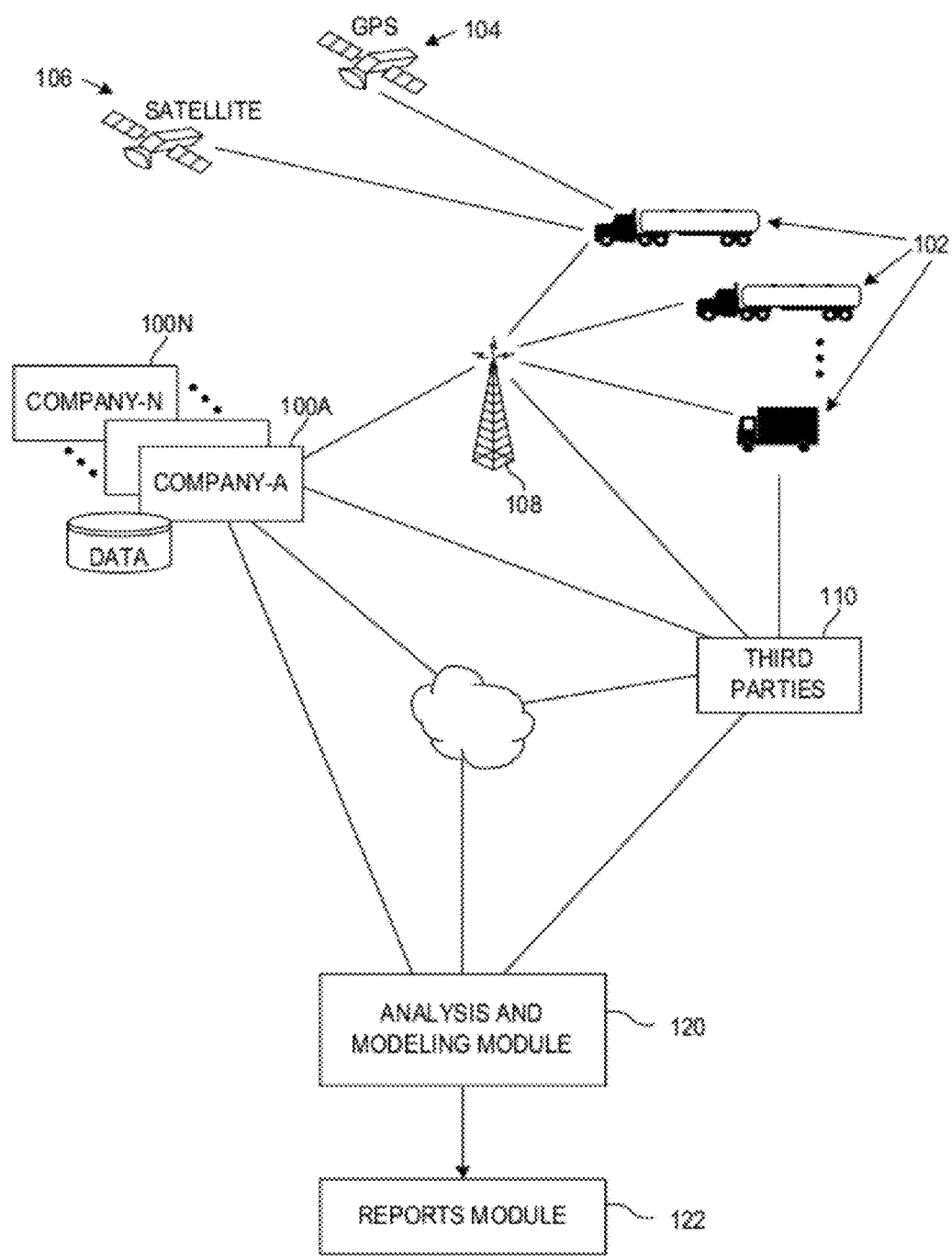
FIG. 1 is a block diagram illustrating a representative environment in which the principles described herein may be practiced.

FIG. 1 is a block diagram illustrating a representative environment in which the principles described herein may be practiced. The example of FIG. 1 assumes that one or more entities, labeled company-A 100A through company-N 100N manages a fleet of one or more vehicles. Representative trucks 102 are associated with company-A 100A in the illustrated embodiment. The company-A 100A may track locations of the vehicles 102 using location services, such as cellular triangulation, global positioning system (GPS) 104 or other satellite 106 tracking mechanisms, and/or other manners of tracking the movement and location of the fleet. Other information may be gathered by the dispatch company-A 100A that may be provided by the vehicles 102 to the company-A 100A by any desired means, such as data transmission via the cellular infrastructure represented by the cellular base station 108. The information may be provided in other manners, such as via satellite 106 and/or other data delivery mechanisms. Company-A 100A may utilize the information in its fleet dispatch operations. Information concerning the vehicles 102 may instead or additionally be collected by one or more third parties 110, such as fuel card providers, mobile communication companies and/or others described in greater detail below.

At least some of the information provided by the vehicles 102 and collected by the dispatch company-A 100A and/or third parties is information that directly or indirectly relates to fuel consumption. For example, vehicles such as commercial trucks typically include an engine control module (ECM) or other electronic control unit that is associated with the engine of the respective vehicle. In addition to assisting with operational functions such as controlling fuel mixture, timing, idle speed, etc., ECMs are capable of providing the data to which they are privy to. For example, an ECM includes a data bus to provide engine data such as RPM, speed, calculated miles per gallon (MPG) of fuel consumed, miles traveled, engine idle time, engine hours, and the like. Such data may be provided to the company-A 100A and/or one or more third parties 110 for numerous reasons.

In accordance with one embodiment, an analysis/modeling module 120 is provided. This module 120 may be embodied in one or more servers or other computing arrangements. Data collected by any one or more of the vehicles 102, company 100A/100N, third parties 110 or other entities can provide data to the analysis and modeling module 120. As described in greater detail below, data that may directly or indirectly impact fuel consumption may be received by the analysis and modeling module 120 in order to analyze the data. Models can be created that accurately identify desired characteristics of the vehicles, drivers and other related characteristics relating to vehicle operation such as fuel consumption. A reports module 122 may be provided to generate physical or electronic reports, charts, graphs and/or other presentations of results of applying the models.

Figure 2:
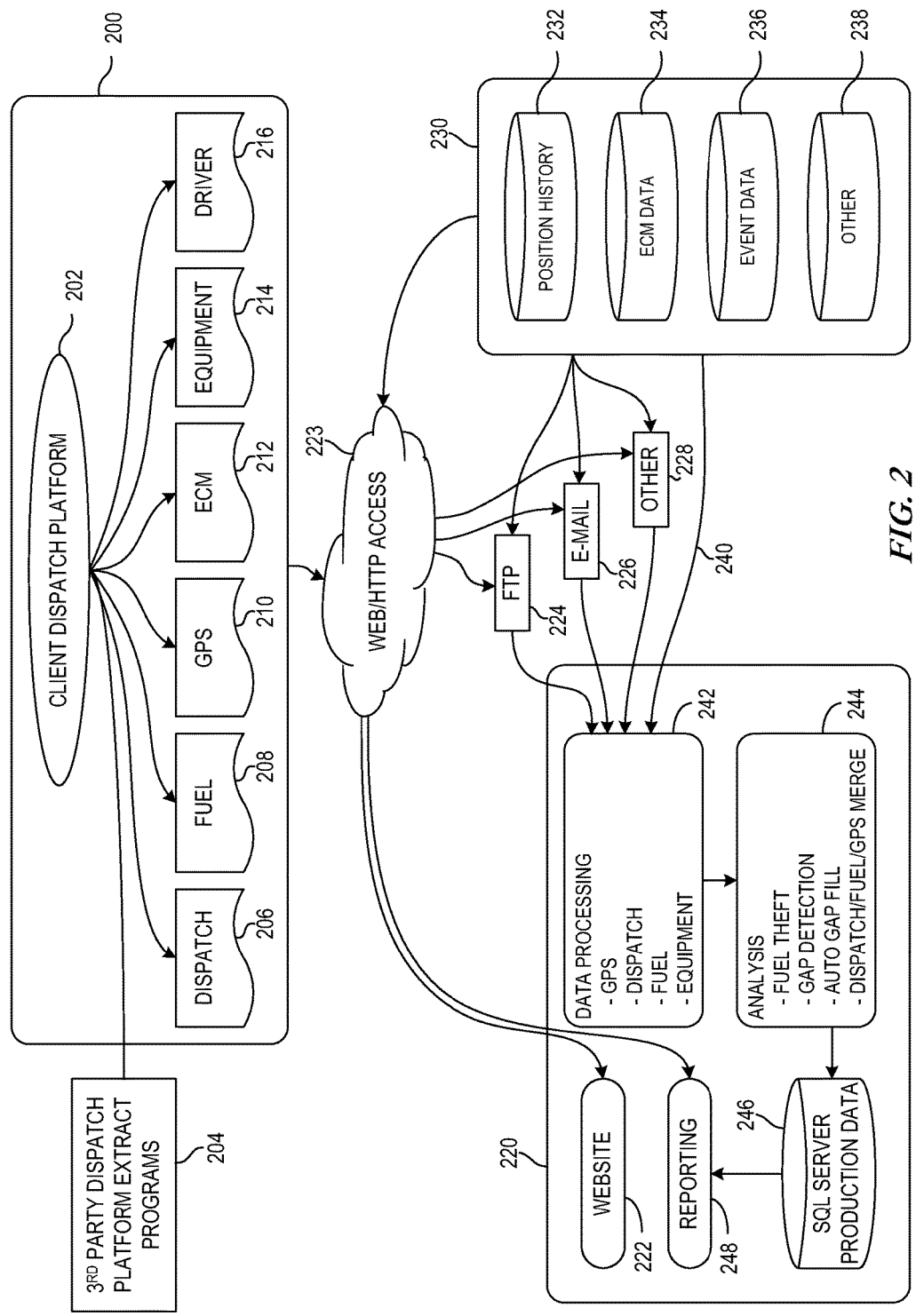
FIG. 2 is a block diagram illustrating a representative system in which principles of the invention may be implemented.

FIG. 2 is a block diagram illustrating a representative system in which principles of the invention may be implemented. A client system 200 is shown, which may include a dispatch platform 202. The client system 200 may be implemented in servers or other computing structures at a company's site, such as company-A 100A of FIG. 1. Third party dispatch platform extract programs 204 can obtain various information relating to any number of trucks/vehicles in a fleet of one or more such trucks or other vehicles. This information may include, for example, dispatch information 206 such as scheduled truck routes, fuel information 208, GPS or other location data 210, data from onboard electronic control modules (ECM) 212, equipment information 214 such as truck, engine or trailer information, driver information 216, etc.

This information may be provided to an analysis and modeling module 220, analogous to the module 120 of FIG. 1. In one embodiment, the information may be provided via a website 222 available to the client system 200 via one or more networks, such as one or more of a local network, metropolitan area network, wide or global area network, etc. In the illustrated embodiment, the website 222 is hosted via a server(s) that is made available over the Internet to provide web/HTTP access as shown at network 223. The information may alternatively or additionally be provided via other data transport mechanisms, such as file transfer protocol (FTP) 224, electronic mail 226 or other 228 manner of transmitting data.

Similarly, one or more third parties 230 may be privy to information that can ultimately be used by the analysis and modeling module 220. As described in greater detail below, such third parties may include fuel vendors, providers of VIN information, mobile communication companies, etc. Information from such vendors may include, for example, vehicle position history 232, ECM data 234, event data 236, and other data 238 such as information relating to vehicle speed, RPM, driver, etc. Such information may be provided via the network(s) 223, directly as shown via line 240, FTP 224, electronic mail 226 or other transmission mechanism 228. The client system 200 and third parties 230 illustrate representative sources of data to provide the desired data for analysis and/or modeling by the analysis and modeling module 220.

Using the data provided by one or more of the data sources, the data may be processed by a data processing module 242. As described in greater detail below, data processing involves, for example, validating location information, compressing superfluous location data, resolving dispatch routes and validating route continuity, resolving fuel purchase locations and checking for duplicate fuel purchase data, vehicle identification number (VIN) decoding, etc.

The analysis module 244 presented in FIG. 2 involves analyzing the data to further validate data, such as by way of automated and manual gap fills for seemingly missing data points, and alignment of data across different data sources. The analysis module 244 also involves the creation of models for categorical variables such as equipment type, company and division, etc. Models can be created for various operational performance areas, such as cost comparisons, excess fuel and theft analysis, missing fuel analysis, driver performance, equipment performance, and the like. The results are stored as production data 246, from which various report 248 forms can be generated. Reports may be produced in hard form, or electronic form such as providing via a website 222.

Figure 3:
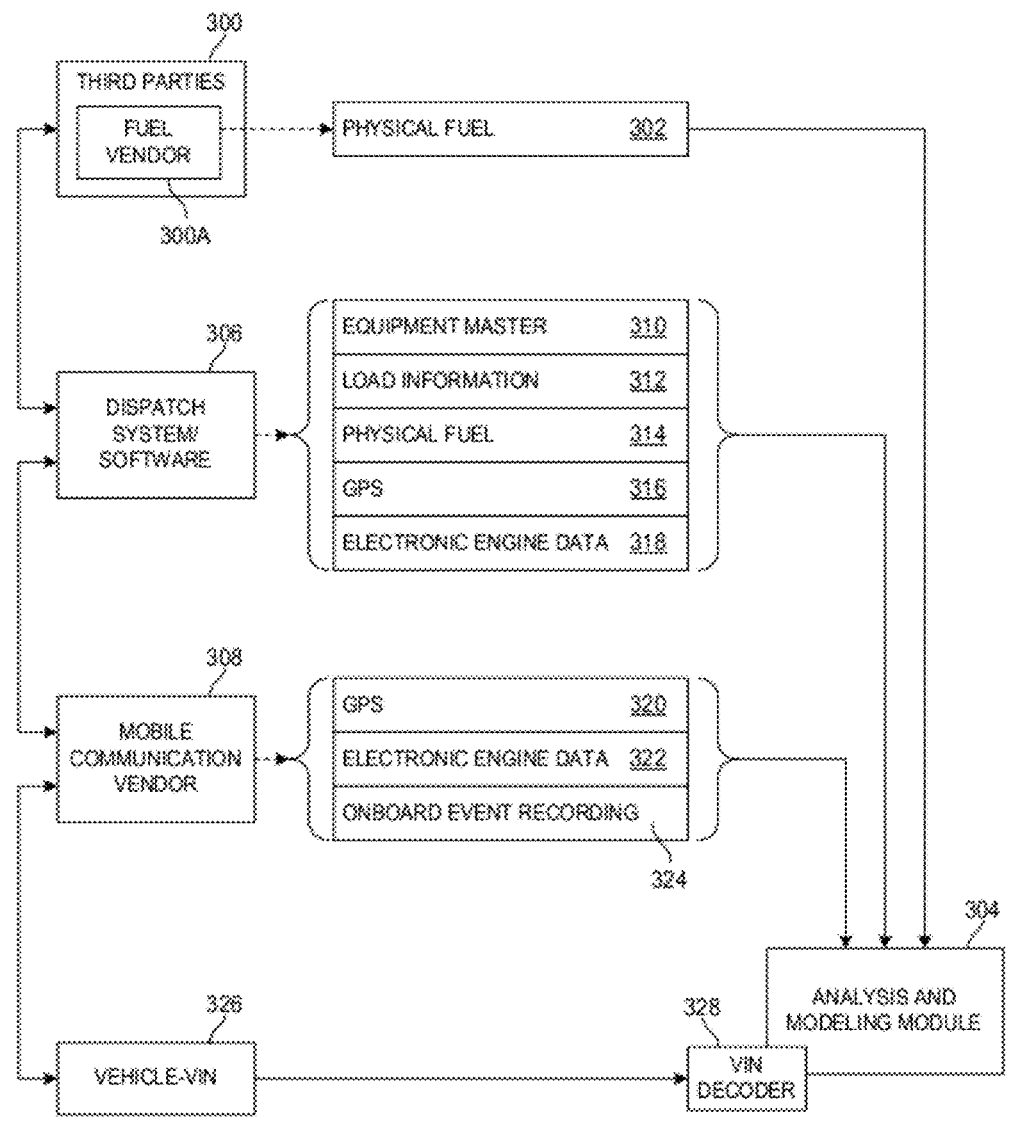
FIG. 3 is a diagram illustrating representative manners in which data may be obtained for use in analyzing and modeling the data in desired manners.

FIG. 3 is a diagram illustrating representative manners in which data may be obtained for use in analyzing and modeling the data in desired manners. As described below, information such as fuel purchases, truck (or other vehicle)

equipment information, load information, fuel consumption as determined by onboard ECM, GPS or other tracking data, onboard event recording and other data may be obtained by one or more sources. FIG. 3 illustrates exemplary sources in which such data may be obtained.

A first data source includes third parties 300, such as a fuel vendor 300A. A fuel vendor 300A can provide credit, such as in the form of a credit card, that can be used by the truck driver to buy fuel. When fuel is purchased using a fuel vendor card, the fuel vendor may retain information such as the quantity of fuel purchased, the location of the purchase, cost of the fuel purchased, date and time of the purchase, etc. This data can provide information relating to the actual or physical fuel usage 302 by the particular truck. This information can be provided directly to an analysis and modeling module 304, or may be provided by way of another entity such as a company's dispatch system/software 306 if the dispatch software has an interface to the fuel vendor 300A.

Another exemplary data source is from a company's dispatch system 306. The dispatch system 306 typically includes dispatch software to enable the company to track their trucks and/or hired owner-operator drivers. Such systems typically track the location of the trucks, as well as whether each truck is loaded, load weight, and so forth. In one embodiment, an interface is provided to the dispatch system software 306 to enable other systems, such as the analysis and modeling module 304 and/or other systems such as mobile communication vendors 308, to obtain the information pertaining to the company's trucks or other vehicles. The company may collect information from their trucks, such as equipment master information 310, which provides truck and/or engine type, model, year, whether an auxiliary power unit (APU) is utilized in the truck, and/or any other information relating to the vehicle itself. This can be obtained whether the company or an independent driver owns that particular vehicle.

Other representative information that may be obtained via an interface or otherwise from a company's dispatch system 306 includes load information 312, which identifies at what times the particular truck was empty or under load, and what the load weight is when under load.

Still other information, such as fuel information 314, GPS or other location information 316 and electronic engine data (e.g. ECM data) 318 may also be provided by a company's dispatch system. For example, some companies may utilize a fuel vendor, and obtain information regarding fuel purchases directly from their fuel vendor. In such cases, fuel 314 purchase information may be obtained from the dispatch system 306, or alternatively may be obtained directly from the fuel vendor 300A. Similarly, GPS or other location information 316 for the company's trucks may be obtained from the dispatch system 306, or from other parties such as a mobile communication company 308. Electronic engine data 318 may also be obtained via the dispatch system 306 or from another party such as a mobile communication vendor 308. The electronic engine data 318 may include any information obtained by the particular truck's ECM or other similar control unit, such as the quantity of fuel consumed and the number of miles traveled to consume that fuel, idle time, RPM thresholds, etc.

Information may alternatively, or additionally, be provided by way of a mobile communication vendor(s) 308. Companies having a fleet of vehicles, or independently owned vehicles may utilize services of a mobile communication vendor 308 such as PeopleNet™ Communications Corporation. With onboard computing on such vehicles to obtain information such as GPS or other location data 320, electronic engine data 322, onboard event recording (OER) information 324 and the like, a mobile communication vendor 308 can collect information that can then be obtained by the analysis and modeling module 304. The OER information may be obtained from event recording at the vehicle, such as recording events such as hard braking or sudden stop events, exceeding RPM thresholds, exceeding speed thresholds, and the like.

As noted above, information obtained by the analysis and modeling module 304 may be vendor-direct, such as from a fuel vendor 300A, mobile communication vendor 308, etc. Other or overlapping information may be dispatch-direct, such as that provided by a dispatch system 306. The information may be obtained via an interface available to the third parties 300, dispatch system 306, and mobile communication vendor 308. For example, the analysis and modeling module 304 may host a web or other network server that provides an online interface to the various data sources. In another embodiment, software utilized by such entities may be modified to provide the information to the analysis and modeling module 304.

In some cases, the fleet company or independent driver does not have a dispatch system 306, or does not have a dispatch system 306 that is integrated with the analysis and modeling module 304 such that the information can be provided to the module 304. In such a case, equipment master information 310 is not available, and the information is obtained using the vehicle identification number (VIN) 326 for the trucks or other vehicles of interest. For example, the customer can provide a list of VINs 326 such as a tractor-VIN list. The VINs can be processed via a VIN decoder 328 which provides equipment master information for the trucks identified by the list 326.

In one embodiment, each piece of the information to be utilized at the analysis and modeling module 304 is obtained from a respective one of the data sources, rather than obtaining the same information from multiple data sources. For example, if physical fuel usage 302, 314 is available via both a fuel vendor 300A and a dispatch system 306, it may be obtained from just one of the sources, although it could be obtained from both. Similarly, if a company's fleet utilizes a mobile communication vendor 308 that is privy to the GPS information 320 and electronic engine data 322, then that information 320, 322 may be utilized rather than obtaining the GPS data 316 and electronic engine data 318 from a dispatch system 306 or other data source. The desired information can be obtained from any one or more of the data sources available to the analysis and modeling module 304.

Figure 4:
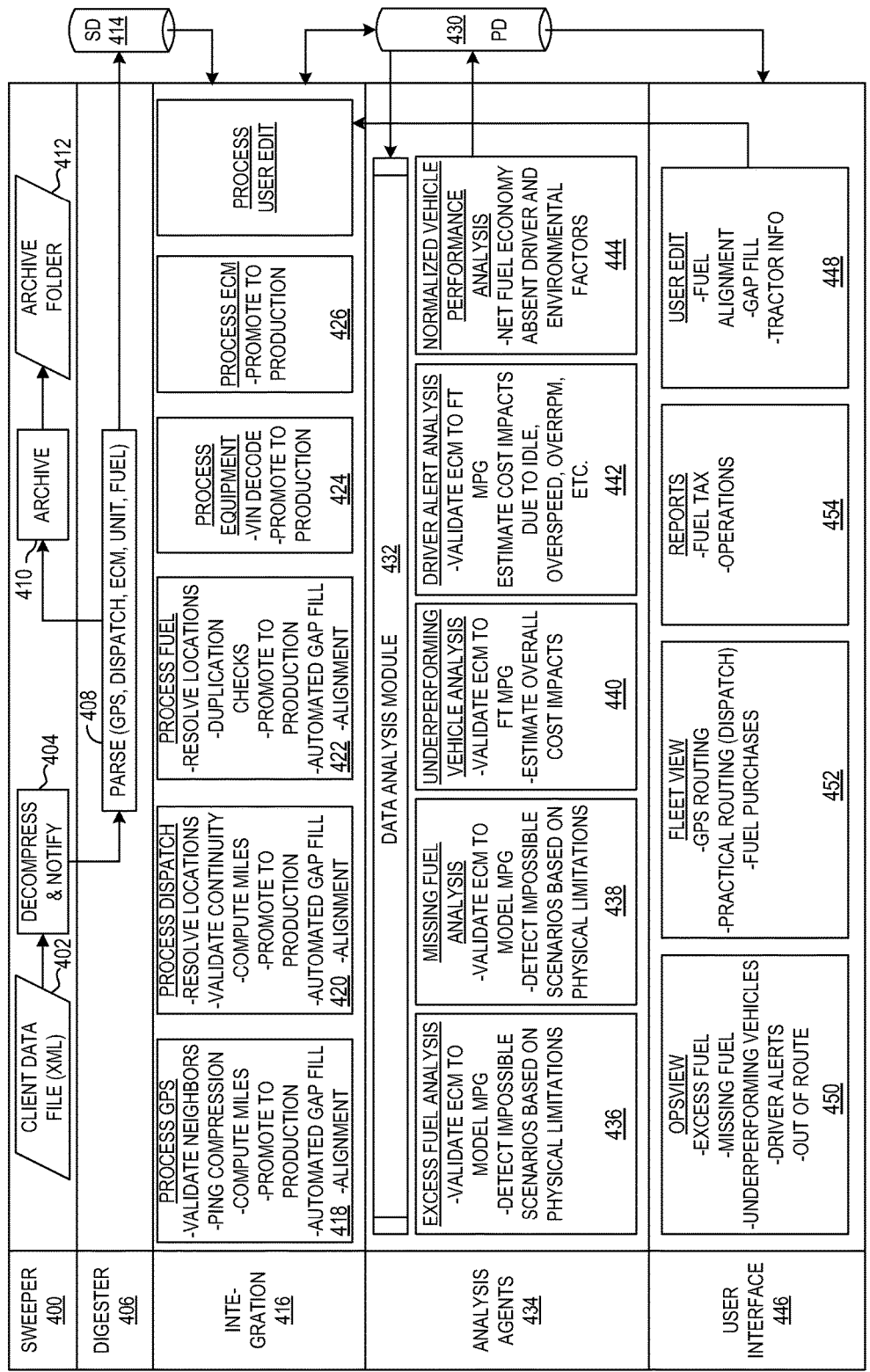
FIG. 4 illustrates a representative data process flow of a process for modeling and reporting fuel-related operational performance.

FIG. 4 illustrates a representative data process flow of a process for modeling and reporting fuel-related operational performance. The sweeper phase 400 generally represents the data acquisition operations. As previously described, data can be provided by one or more data sources. The sweeper phase 400 involves bringing in data elements 402 from the various data sources. In one embodiment, the data is provided as client data extensible markup language (XML) files, although any format may be implemented. If the data is compressed, it is decompressed 404. Further, block 404 includes configurable notification features. For example, analysis of the incoming data is performed, and certain data may be expected. If expected data is not received, or does not match what is expected, this can trigger a notification. For example, if data is being received for a month of fuel data, it can be determined whether a month of data has actually been received, and a notification can be provided based on that determination. Other notifications may be unrelated to the specific data, such as a notification that data has arrived, has arrived from a particular data source, or the like.

At the digestor phase 406, the received data is parsed 408. For example, different data types may be parsed from the raw data, such as GPS data, dispatch data, ECM data, etc. Some or all of this data may be archived 410 and associated with an archive folder 412. The processed data is stored as staging data 414, such as in initial staging tables, to organize the data in usable formats.

At the integration phase 416, processing of the staged data to facilitate subsequent modeling begins. In general, the integration operations involve processes such as the evaluation of data quality and usability, identification of missing or irregular values, and creation of uniform values. At block 418, GPS or other location data is processed. GPS data is not always accurate, as latitude/longitude coordinates may be received that are known to be erroneous. For example, a truck may accurately be providing location coordinates from point A to point B, while some coordinates are then received that would put the truck too far from the path to be physically possible. This validation of neighbors determines whether a stream of GPS or other location data is reasonable, and if not, such data points may be disregarded. Further, "ping" compression may be employed. If GPS "pings" regularly occur, there may be times when superfluous data is obtained, such as when the truck has stopped at a location for a lengthy time. In such case, a single GPS coordinate may be used rather to represent that location over the time the truck was stationary. Miles traveled can be computed from the GPS data. These and other location data processes may be utilized.

At block 420, dispatch data may also be processed, where dispatch data is available. Dispatch information may include scheduled route information. Dispatchers typically control the entry of such data, and therefore the possibility of human error exists. Further, a dispatcher may only enter the route information relating to the billable route, such as from point B to point C, and fail to enter the portion of the route to get the truck from its current point A to the initial billable route point B. Thus, the entire route of the truck may have a gap, which can adversely impact fuel analysis and modeling if this gap is not accounted for. Thus, the dispatch processing 420 can validate continuity, such as by using the trucks last shipment drop point, using GPS coordinates, etc. Dispatch processing may also involve location resolution. For example, some dispatch locations may be written in terms of company-specific titles (e.g. home office) that is not inherently tied to a location. Dispatch processing 420 may also involve computing miles. Miles traveled for each individual leg of a route can be determined from the dispatch data route plan. This may become important as load weight data can also be obtained, and the load weight for each leg of the route may impact fuel economy. These and other dispatch data processes may be utilized.

At block 422, fuel information may be processed. Fuel data may be obtained from, for example, a third party such as a fuel vendor, by the company by way of dispatch software, by the driver by way of receipts, etc. Fueling locations can be resolved, such as by comparing the vehicle's location at the time of fueling to the location of the reported fueling station. Checks on duplication of fueling information can also be resolved.

At block 424, equipment information may be processed. Equipment may include, for example, the type of truck or engine, trailer information, whether the vehicle includes an APU, etc. Such information may be obtained from dispatch software, or other manners such as a VIN decode. ECM processing is also provided, as shown at block 426. ECM data represents the electronic engine data provided by the vehicle's onboard computing device.

This "cleansed" data may be promoted to production data 430 to provide integrated data sources. In one embodiment, some of the production data 430 may be returned to the integration phase 416 to perform additional processing. In one embodiment, some data may be aligned across processing functions. For example, given a stream of GPS data over a period of time, those location points can be matched to other data such as the truck dispatch events and fueling events. As a more particular example, alignment of data can involve aligning the GPS coordinates at a certain date/time with the location data provided via dispatch software and/or with location data of a fueling event at that date/time. Such alignment processes are depicted at blocks 418, 420 and 422, although alignment can be performed with data from other processes as well.

Processing information such as location data, dispatch data and fuel may exhibit gaps in the data. GPS transmissions can fail or generate faulty data, which can create a gap in the route traveled. As noted above, route segments provided by dispatch operators can also exhibit gaps, where not every leg of a route is accounted for. In the context of fuel data, dispatch software or fuel vendor information could have missing information as to fuel purchases. These and other data provided for analysis and modeling exhibit such data gaps. In one embodiment, an automated gap fill feature shown at process blocks 418, 420 and 422 enables such gaps to be filled based on knowledge determined from other data. For example, if GPS pings are not communicated for some time along a truck's route, the automated gap fill feature recognizes the discontinuous GPS data, and can use data such as fueling events, dispatch billing events and/or other similar data to identify the route taken by the vehicle. This information can be used to fill the location gaps during the time of the GPS data gap, and reduce ambiguity in view of lapses of otherwise expected data. In one embodiment, automated gap fill is performed after alignment, as the gaps may become more clear following the alignment process. After any alignment and/or gap filling, the data is promoted, or in some cases again promoted, to production data 430.

To augment automated alignment and gap fill processes, a user edit function 448 is provided via a user interface 446. This enables a manual override of any automated processes that may need adjustment, or to update other information that has changed such as equipment information.

At this stage, the preliminary steps to clean the data are complete, and the data is in the production database 430 and ready to be provided to the analysis agents 434. The data analysis models 432 represent models created by which various analyses can be performed. While creation of data analysis models 432 is described more fully below, it generally involves creating models from the production data 430 to provide information such as predicted MPG of a particular vehicle operating under particular conditions. The models can be applied in any number of ways, such as to provide analyses of excess fuel 436, missing fuel 438, underperforming vehicles 440, driver alerts 442, normalized vehicle performance 444, etc. These value added services, and other aspects of the analysis agents phase 434 are described in greater detail below.

Results of the analyses 436, 438, 440, 442, 444 and/or any other analyses, and in some cases resulting data models 432, are stored in the production database 430. This data can be used to generate reports and electronic views of the results of the analyses and other data involved in the analyses. For example, results can be presented electronically via computers, web sites, etc. Examples include the operations view 450, which present operational metrics that generally correspond to the output of any of the various analyses 436, 438, 440, 442, 444. Reports 454 can be provided for substantially the same information, but in a non-electronic form. The fleet view 452 provides online or other electronic views of selected data, such as GPS routes and miles traveled, physical fuel purchases, etc. In one embodiment, information provided via the fleet view is organized data without analysis.

FIG. 5 is a table 500 illustrating more particular examples of data arriving from the various data sources, and how they may be employed in the data models. Column 502 identifies various representative data sources, including client enterprise resource planning (ERP) "dispatch" software, electronic engine data or "ECM" data, onboard event recorders, fuel purchase history, and GPS and mobile communications systems. Each of these data sources can provide various data. For example, the client dispatch software may provide information such as the equipment master (e.g. vehicle ID, make, model, year, etc.), VIN, company information, empty/loaded status, load weight, etc.

Column 504 represents the processes that may be involved for the particular data type. For example, equipment master information is imported and validated, whereas cash fuel purchases may be obtained through the website of the fuel vendor.

Column 506 represents the model data type for each type of data, and column 508 indicates the role of the model data type in model development. Data such as the equipment master, VIN and company information are categorical variables that are analyzed to find statistically similar groups for modeling purposes. The information is broken into categorical groupings with analysis of variance to identify which groups have certain distinct characteristics, and within those distinct groups models can be created. The groupings represent the unique categories of equipment and operational type, such whether it is a "van" versus a refrigerated truck, or the make and model of the truck, etc.

Data such as empty loaded status, load weight, idle time, speed and RPM, miles traveled, fuel used, and driver characteristics (e.g. hard braking, rapid starts) are representative of data referred to as continuous variables shown in column 506. Continuous, or "virtual" variables are used to generate model coefficients within each of the statistically significant categorical groupings.

Each model provides a mechanism for predicting fuel consumption and MPG for each unit (e.g. vehicle or driver) based on the unit's individual activities (variables). Dispatch, ECM, and OER, for example, can be described as "virtual" data sources because they involve estimated representations of physical travel and fuel consumption. These "virtual" representations deviate from the physical variables in a non-uniform manner.

These variances between "virtual" and "physical" are accounted for in the model type "continuous variable—physical fuel" shown in column 506. This model type may be used as the "y" or "left-side" variable in the equation y=mx+b, which is discussed more fully below. These continuous or "physical" variables may also be used to correct for variances (bias) between a virtual model's estimated fuel consumption and actual physical fuel consumption. This allows model (predicted) fuel consumption to net out against physical consumption.

Figure 6:
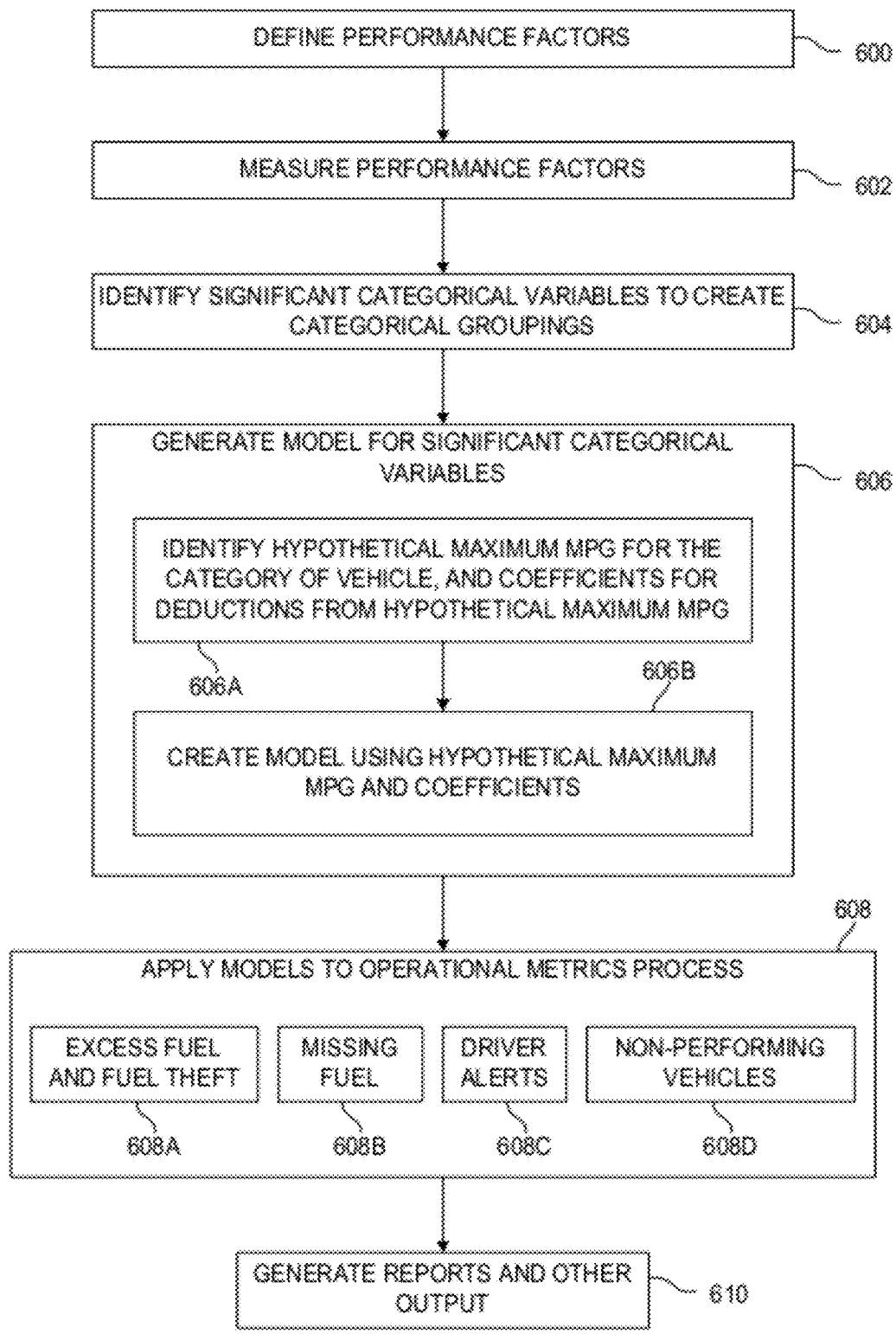
FIG. 6 is a flow diagram illustrating a generalized process for modeling and reporting fuel-related operational performance.
Figure 7:
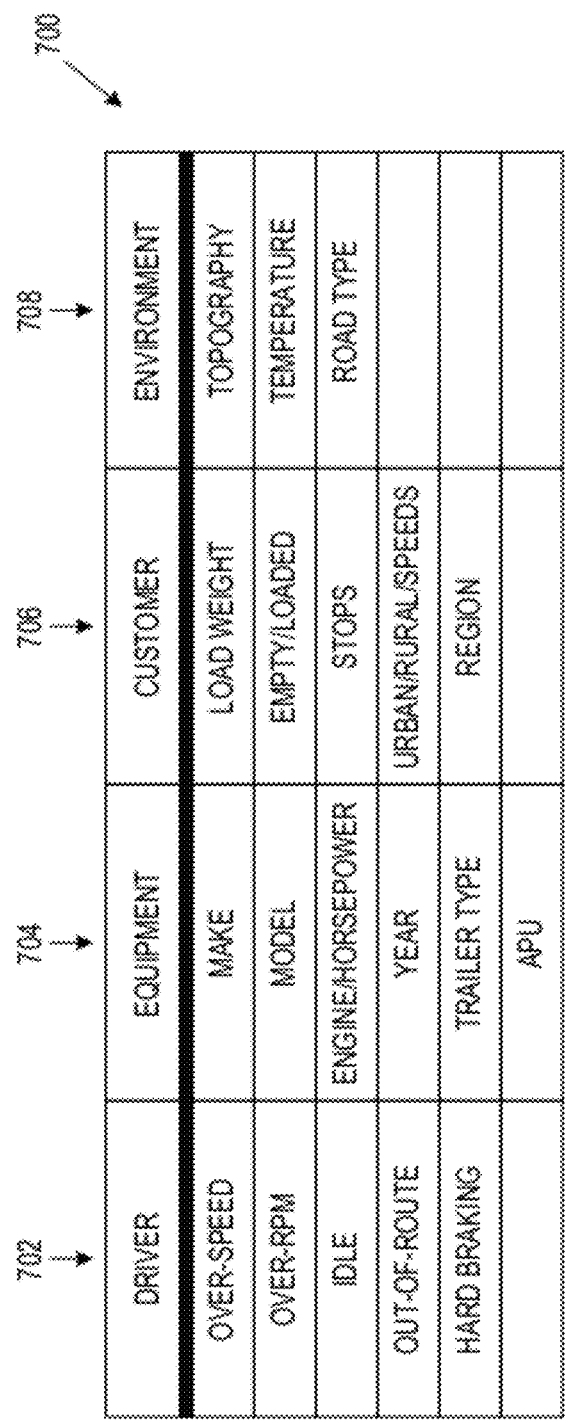
FIG. 7 is a table of representative performance factors that can impact fuel consumption.

FIG. 6 is a flow diagram illustrating a generalized process for modeling and reporting fuel-related operational performance. Performance factors are defined 600, which represent the factors associated with the driver or vehicle that may impact fuel performance. Examples of such defined performance factors are shown in the table 700 of FIG. 7. The factors listed in table 700 is a representative list only, and does not suggest that all of the factors will be used, or that only factors in the table will be used in the modeling exercise.

The factors listed in table 700 are divided into groups for purposes of discussion. For example, factors associated with the vehicle driver 702 include over-speed, over-RPM, idle time, out-of-route and hard braking. These factors are of the continuous variable model type described in connection with FIG. 5. Over-speed may be represented in percentage, and generally refers to the percentage of time that the vehicle travels over a threshold speed (e.g. >65 miles per hour) relative to the engine move time. Over-RPM is similar, in that it refers to the percentage of time the vehicle RPMs are over a threshold RPM (e.g. >1700 RPM) relative to the engine move time. Idle may also be presented as a ratio of the engine idle time relative to the total engine operation time. Out-of-route information is based on location data, and indicates when the driver deviated from the planned route. Hard braking refers to braking in an abrupt manner.

Equipment performance factors 704 are of the categorical variable model type described in connection with FIG. 5, and include factors particular to the vehicle. Such factors include the make, model and year of the vehicle, as well as engine/horsepower, trailer type, whether the truck is equipped with an APU, etc. Customer factors 706 are those that may be provided by the trucking company or independent operator. These include items such as load weight and empty/loaded status, stops along the route, urban/rural areas and associated speeds, etc. Environment factors 708 include, for example, topography, outside temperature, road type, etc.

Returning to FIG. 6, at least some of the performance factors are measured 602. Some or all of these factors may be obtained from the customer, such as by way of customer dispatch software. Significant categorical variables are identified to create categorical groupings as shown at block 604. Models can then be generated 606 for significant categorical variables. In one embodiment, a hypothetical maximum MPG for the category of vehicle or "baseline MPG," and coefficients to define deductions thereto, are identified 606A. Using these values, a model is created 606B. Representative manners in which models are created is described more fully below.

The generated models may then be applied 608 to operational metrics processes for excess fuel and/or fuel theft 608A, missing or potentially unreported fuel 608B, driver alerts 608C, non-performing vehicles 608D, etc. Examples of applying the models are provided below. Reports and other output from the models can be provided as shown at block 610.

The generation of models has been briefly described in connection with the analysis agents 434 of FIG. 4, model generation 606 of FIG. 6, and elsewhere. An exemplary manner in which a model may be created is now described.

In one embodiment, the model is built based upon electronic engine data from the vehicle. Electronic engine data (also referred to herein as ECM data or simply ECM) is obtained, such as described in connection with FIG. 4. In one embodiment the modeling begins with Equation 1 below:

$$y = mx + b \qquad \text{EQUATION 1}$$

Using a regression analysis, the hypothetical or theoretical maximum MPG for the category of vehicle and the coefficients of the model may be determined using Equation 1. The hypothetical or theoretical maximum MPG for the category of vehicle (hereinafter referred to as the "baseline") is represented by the constant "b" in Equation 1, where the plotted line intersects the y axis, and the continuous variable is represented by m, the slope of the plotted line.

Figure 8A:
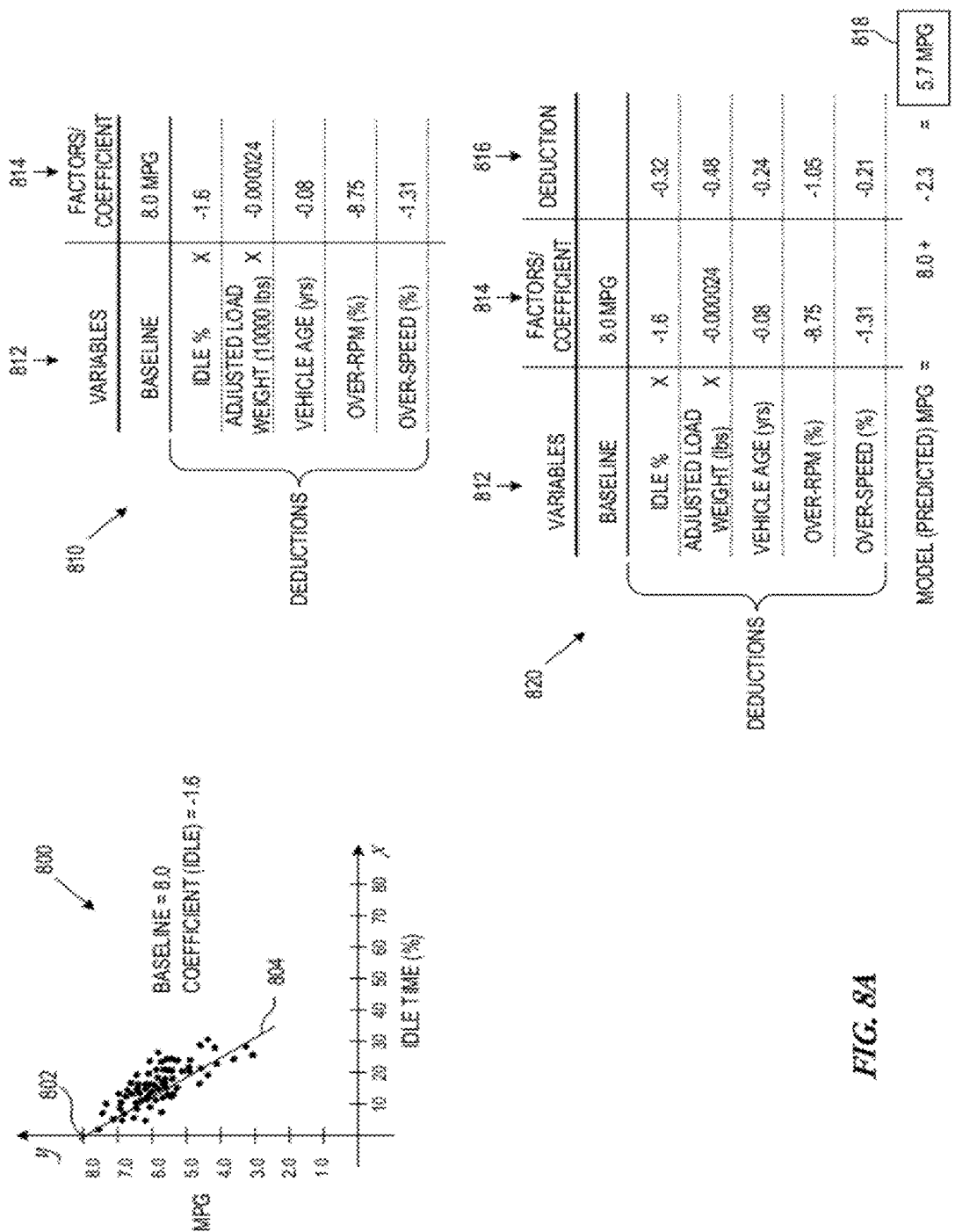
FIG. 8A graphically depicts a regression analysis that identifies the baseline and coefficients for a predicted MPG in view of one continuous variable.

As an example, FIG. 8A graphically depicts a regression analysis that identifies the baseline and coefficients for a predicted MPG in view of one continuous variable, which is idle time in the illustrated example. FIG. 8A depicts plotted data points relating to idle times of vehicles in that category of vehicle. For example, the ECM data for a first truck may show that a truck (in this category of vehicle) with 30% idle time showed 7.5 MPG over that time. Each such piece of data is considered in the regression analysis, which is depicted on the graph 800 in FIG. 8A. As seen, a regression analysis based on the input data results in a baseline intersect 802 of 8.0, meaning that the theoretical maximum MPG for the trucks in that category of vehicles, assuming no load weight, idle time, over-speed or over-RPM, etc., is 8.0 MPG. The coefficient for idle time percentage is −1.6 depicted by the slope of the line 804. Thus, a predicted MPG for a vehicle in that category of vehicles, considering only idle time as a continuous variable, could be predicted by y=mx+b, or:

$$\text{predicted MPG} = -1.6(\text{idle time \%}) + 8.0 \quad \text{EQUATION 2}$$

Therefore, a predicted MPG can be determined for a particular truck in that category of vehicles based on idle time percentage. If data reveals that a truck of the particular categorical group had 30% idle time, the predicted MPG equals −1.6(0.30)+8.0=7.52 MPG.

Similar analyses can be made for other continuous variables. As shown at table 810, the illustrated model also considers variables 812 such as adjusted load weight (e.g. load weight adjusted by the vehicle's empty/loaded ratio), vehicle age, over-RPM % (e.g. RPM time over threshold relative to engine move time), and over-speed % (e.g. speed time over threshold relative to engine move time). Coefficients 814 can be identified using regression analysis in a manner similar to the manner in which the idle time coefficient was determined at graph 800. Use of the model is shown at table 820, which identifies the actual deductions 816 for a given truck having the following continuous variables:

| | |
|---|---|
| Idle % | 20% |
| Adjusted Load Weight (lbs.) | 20,000 lbs |
| Vehicle age (years) | 3 years |
| Over-RPM % | 12% |
| Over-speed % | 16% |

For example, an adjusted load weight of 20,000 is multiplied by the determined coefficient of −0.000024, resulting in a deduction of −0.48. Deductions for the other variables are determined in a similar manner, ultimately resulting in a total deduction based on the listed variables of −2.3 MPG. Therefore, the predicted or "model" MPG for this truck under these conditions is the baseline MPG of 8.0, added to the total deduction of −2.3, for a final MPG of 5.7 MPG as shown at block 818.

FIG. 8A illustrates a representative data modeling process involving a percentage-based model. For example, percentage-based models described herein may relate to MPG. Other modeling techniques may be used to arrive at the same or similar end goal, which relates to the impact on fuel consumption in view of one or more variables. In one example, a model for expected fuel consumption rates may be used, and from modeling those consumption rates an MPG value may be derived. Thus, as an alternative to starting with a theoretical best MPG and deducting from this theoretical MPG value based on variables, a relationship between time and physical fuel consumption may be used. In such an example, the model relates to the impact of various factors on fuel consumption in that vehicle.

Figure 8B:
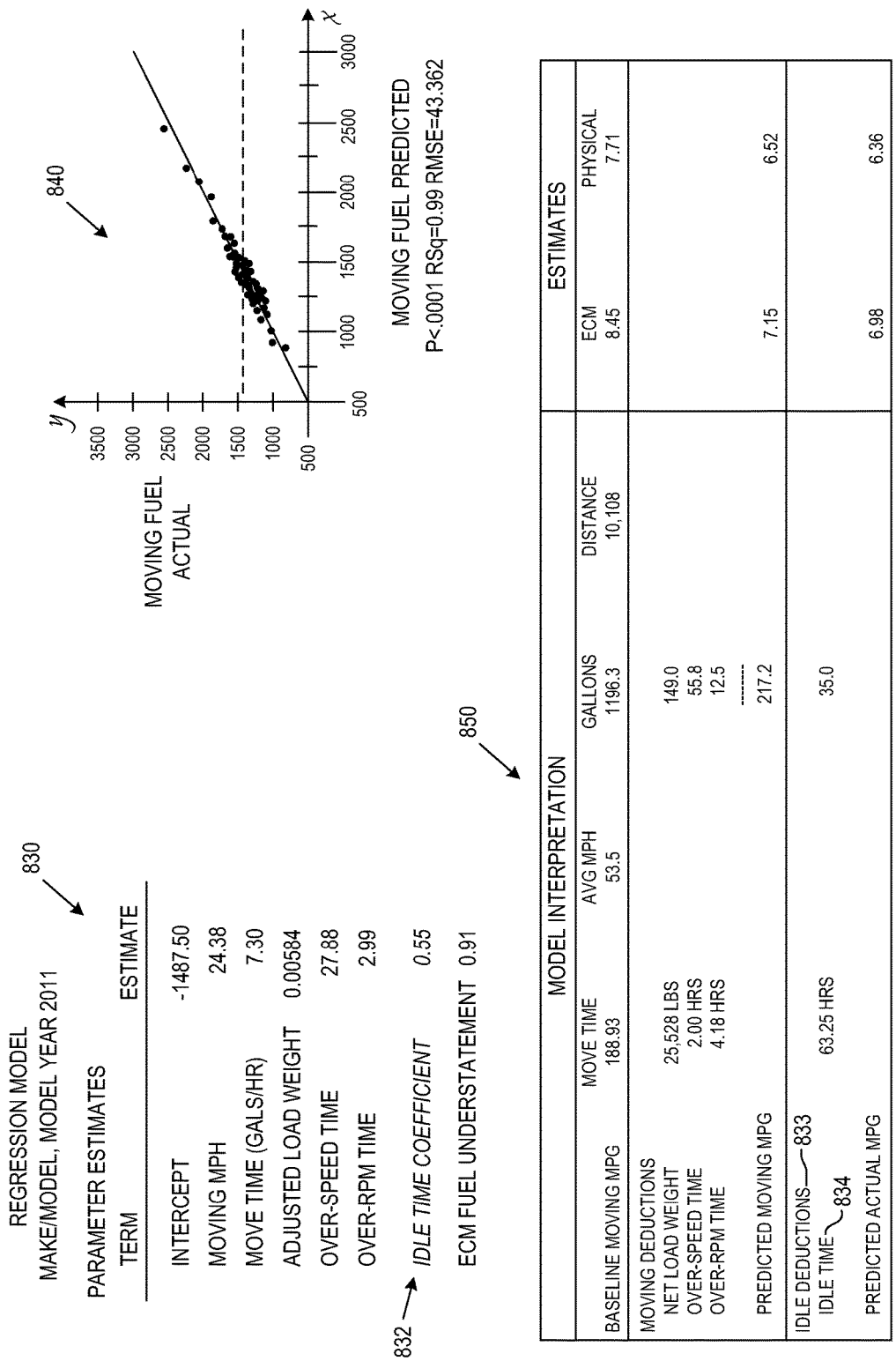
FIG. 8B illustrates a time-based model that relates to fuel consumption in a vehicle.

FIG. 8B illustrates a time-based model that relates to fuel consumption in a vehicle. In this example, the model assumes two types of fuel consumption—one where the vehicle is moving, and one where the vehicle is not moving. If the vehicle's engine is running but the vehicle is not moving, this is referred to herein as idle time fuel consumption. When a vehicle is not moving while idling, the amount of time that it was idling can be determined, and using statistical models or engine data the quantity of fuel consumed while idling can be determined. FIG. 8B includes a chart 830, graph 840 and table 850 including information for the representative time-based example, where idle time is taken into consideration. For example, the table 850 includes idle deductions 833 that includes idle time 834, which is 63.25 hours in the illustrated example. In one example, using the idle time coefficient 832 of 0.55, this idle time corresponds to 35.0 gallons of consumed fuel, which is the idle gallons of fuel burned per hour of idling.

Distinguishing between idle time fuel consumption and moving time fuel consumption is considered in this example because certain variables may not be relevant during idle time. For example, the load weight is irrelevant to fuel consumption when the vehicle is not moving, as the engine is not impacted by the load weight. Speed is also not a factor when idling, as speed is zero. Thus, a more accurate, or at least different calculation of fuel consumption may be obtained when using the time-based analysis of idle time versus moving time. Thus, a baseline moving MPG may be calculated, with factors such as load weight, speed and/or overspeed, RPM and/or over-RPM, and/or other factors then impact that baseline moving MPG. Fuel consumption based on idle time is then included to provide fuel consumption based on move time and on idle time. Thus, the example of FIG. 8B relates to a time-based system that relates to fuel consumption, versus a percentage-based system that relates to MPG.

Returning to FIG. 4, the data analysis models 432 includes such regression analyses as that described in connection with FIG. 8A. Various value-added services 436-444 represent illustrative manners in which such models 432 can be applied. Examples of the creation and use of such applications of the models are now described.

One representative analysis shown in FIG. 4 that can be created is an excess fuel analysis 436. This analysis can use the model MPG to determine whether the fuel that should be in the tank exceeds what is actually in the fuel tank. This is determined by identifying that the fuel tank level would, based on the model, exceed the tank's fuel capacity. This can be indicative of various issues, including fuel theft from the truck.

In order to accurately make such an analysis, a first analysis is performed which is identified in block 436 of FIG. 4 as validating ECM to model MPG.

To understand why such validation is important, some information on electronic engine data, such as that provided via an ECM, is provided. ECM data may not always be reliable. The modeling process may be used to determine the reliability of the electronic engine data that is received and used to create the MPG model, such as that shown in FIG. 8A. ECM data can be unreliable for various vehicles, whereby there is a significant difference between what the electronic engine data indicates for MPG and what the "physical" fuel economy is. Physical fuel economy can be determined from, for example, actual fuel consumption and miles traveled, which are data that are obtained by the system. In some cases, ECM data exhibits greater than 10% better fuel economy than what physical data would suggest. Therefore, where applications of the model to provide an analysis such as excess fuel, which can be indicative of fuel theft, the MPG of the model created by ECM data should be validated relative to physical fuel calculations.

Figure 9:
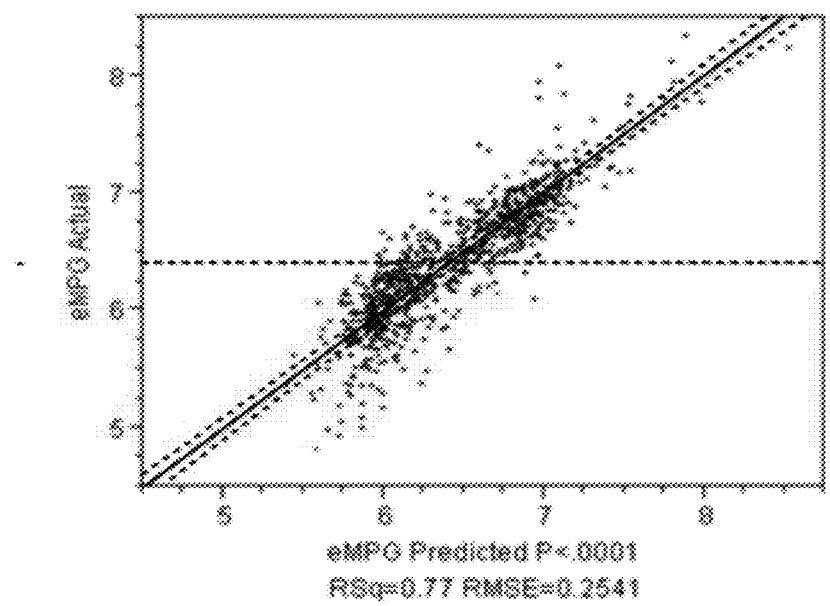
FIG. 9 illustrates a model that validates actual electronic MPG based on predicted or model electronic MPG.

Thus, model MPG can be adjusted to physical fuel, and validated with the model to ensure that the ECM data is reliable. Models can validate whether the ECM data can be relied on, as the models can take into consideration data such as load weight, empty/loaded status, etc. As a model of expected performance can be created, it can be compared to that of the ECM data. FIG. 9 illustrates a model that validates actual electronic MPG based on predicted or model electronic MPG. From this analysis, it can be determined if the ECM data is reliable, and if not, it can be adjusted accordingly. The result is then used in the excess fuel analysis 436, which detects impossible fuel scenarios based on physical limitations, where the adjusted MPG from the validation is used in the analysis.

FIG. 10 illustrates results of an excess fuel calculation in a table 1000. In this example, an adjustment to the ECM data was utilized in response to the validation of ECM data to model MPG, as shown by the "ECM MPG Correction Factor: 0.96" 1002. In simple terms, this reflects a 4% difference between what the electronic engine data reported and what the physical or actual fuel economy was. Thus, as the ECM for this truck appears to be insufficiently calibrated by 4%, a correction factor is applied to more accurately reflect physical fuel burn. For example, if the ECM MPG indicates 6.25 MPG, the physical MPG would be adjusted by 4%, such that the physical fuel, and that used in the analysis of FIG. 10, would be 6.0 MPG.

In the analysis, various factors are considered, including the tank capacity for the truck, and electronic MPG adjusted by the correction factor of 0.96. The ECM MPG 1004 is then shown as 6.53 MPG. The table 1000 shows information such as the date of fuel purchase 1006, fuel quantity purchased 1008, miles to next purchase 1010, fuel used to next purchase 1012, starting fuel level 1014, adjusted starting fuel level 1016, ending fuel level 1018, adjusted ending fuel level 1020, and findings 1022. Thus, on Feb. 1, 2010, the driver purchased 60.5 gallons of fuel and traveled 775.1 miles. Based on the adjusted MPG of 6.53 MPG, the vehicle used approximately 118 gallons of fuel to travel 775.1 miles. It is therefore known that the vehicle started with at least 60 gallons of fuel, but it is assumed at least 80 gallons were in the tank initially based on the assumption that the driver would not allow the truck to have less than 20 gallons of fuel at any time. Knowing that the vehicle just burned 118 gallons of fuel, the ending level 1018 indicates −38.3 gallons of fuel in the tank, which is not physically possible, and therefore the initial estimation of fuel in the tank was a low estimate. Nevertheless, the calculations can continue in this manner until the starting level 1014 substantially corresponds to the fuel capacity of the fuel tank. This can be accomplished by adding the last calculated ending level 1018 to the current purchase quantity 1008. At this point, it is known that the fuel tank is full 1024. From this reference point forward, the truck fuel consumption can be accurately followed, data such as miles traveled 1010, gallons of fuel used 1012 and purchased fuel quantity 1008 can be tracked. As shown at location 1026, an amount of fuel (239.1 gallons) is greater than the capacity of the fuel tank, resulting in a finding of an excess amount of fuel of 39.1 gallons. While other factors can contribute to more fuel being used than the model accounted for, vehicles showing up with a pattern of excess fuel may exhibit characteristics of fuel theft from the truck. Without being able to rely on the modeling to validate ECM fuel data to model MPG, such an analysis could present erroneous results, and even result in erroneous accusations of fuel theft.

FIG. 11 illustrates a similar example pertaining to missing fuel. This analysis corresponds to the analysis 438 of FIG. 4. Again, a validation of ECM MPG to model MPG is performed, and a correction factor is applied if necessary (0.97 in the example of FIG. 11). A missing fuel analysis determines whether there is actually more fuel in the fuel tank than has been reported. A determination of missing fuel can cause problems in other ways, such as fuel tax and state miles issues. The analysis of the data of FIG. 11 is carried out much in the same way as that described in connection with FIG. 10, where it is first determined when the tank appears to be full of fuel 1102. As processing from this reference point continues, it is determined 1104 that the expected tank ending level is negative, indicating that there is more fuel in the tank than expected.

Analyses such as excess fuel and missing fuel can be put into reports, such as shown by the tables 1000 and 1100, which corresponds to any one or more of the operations view 450 and reports 454 shown in FIG. 4.

Referring again to FIG. 4, another representative analysis that can be performed relates to underperforming vehicles 440. In this analysis, a validation of ECM MPG to "fuel tax" MPG is performed, rather than a validation of ECM to model MPG. Each interstate carrier has to account for where they traveled, and the quantity of fuel consumed in that state. Where ECM data may indicate a truck used 25 gallons of fuel, the quantity of fuel physically burned is the actual representation of fuel use. Thus, fuel purchase information, GPS coordinates, odometer readings, and/or other data can assist in the identification of physical fuel burned. These categories of data are also shown in FIG. 5, including "Fuel Purchase History" and "GPS/mobile communications systems" information that are of the model data type 506 of "continuous variable—physical fuel." Thus, fuel tax or "FT" MPG substantially represents the physical version of how much fuel was burned. Therefore, validation of ECM to FT MPG at block 440 of FIG. 4 differs somewhat from ECM to model MPG at blocks 436 and 438. The physical fuel variables can be used as the "y" or "left side" variables in the y=mx+b formula. The validation is otherwise similar to that described in connection with FIGS. 8 and 9.

The underperforming vehicle analysis 440 of FIG. 4 provides an estimate of the overall cost impact on vehicle performance. FIG. 12 illustrates a report 1200 from an analysis of underperforming vehicles. This analysis compares an average 1206 of the ECM MPG 1204 and the fuel tax MPG 1202 (or an adjusted MPG by way of validation thereof) to the calculated model MPG 1208 such as determined in the analysis of FIG. 8A. The average model MPG 1210 represents the difference between the model MPG 1208 and the average MPG 1206. Where the average model MPG 1210 shows a negative number, and in particular a large negative number, this represents poor MPG performance of that vehicle relative to the MPG that vehicle was expected to get based on the model. For example, in the first row an extra fuel 1212 quantity is shown as 165.6 gallons due to the truck's MPG being significantly less than what was expected, resulting in s cost 1214 of $432.20 (based on an assumed fuel cost of $2.61/gallon). Such analyses can be put into reports, such as shown by the table 1200, corresponding to any one or more of the operations view 450 and reports 454 shown in FIG. 4.

Yet another representative analysis of FIG. 4 is the driver alert analysis 442. Such analyses relate to cost impacts due to factors such as idle, over-speed, over-RPM, etc. Similar to that of the underperforming vehicle analysis, a validation of ECM MPG to fuel tax (e.g. physical) MPG is performed to ensure that the ECM data is reliable. In a manner analogous to that of analyzing underperforming vehicles, a particular factor such as driver idle time can be applied to a validated ECM MPG, or physical MPG, to identify costs associated with driving characteristics. Assume, for example, a baseline MPG of 8.0 and an idle time coefficient of −1.6 as shown in FIG. 8A. A driver having a 20% idle time will result in a deduction of 0.32 (i.e. −1.6×0.20). The cost of idling for this idle time percentage is therefore 0.32 MPG, which would relate to an extra five gallons of fuel burned, or $15 in additional cost, for every 1000 miles traveled at an average fuel cost of $3.00/gallon. Similar analyses can be performed based on modeling as described herein for other factors such as over-speed and over-RPM.

Figure 13A:
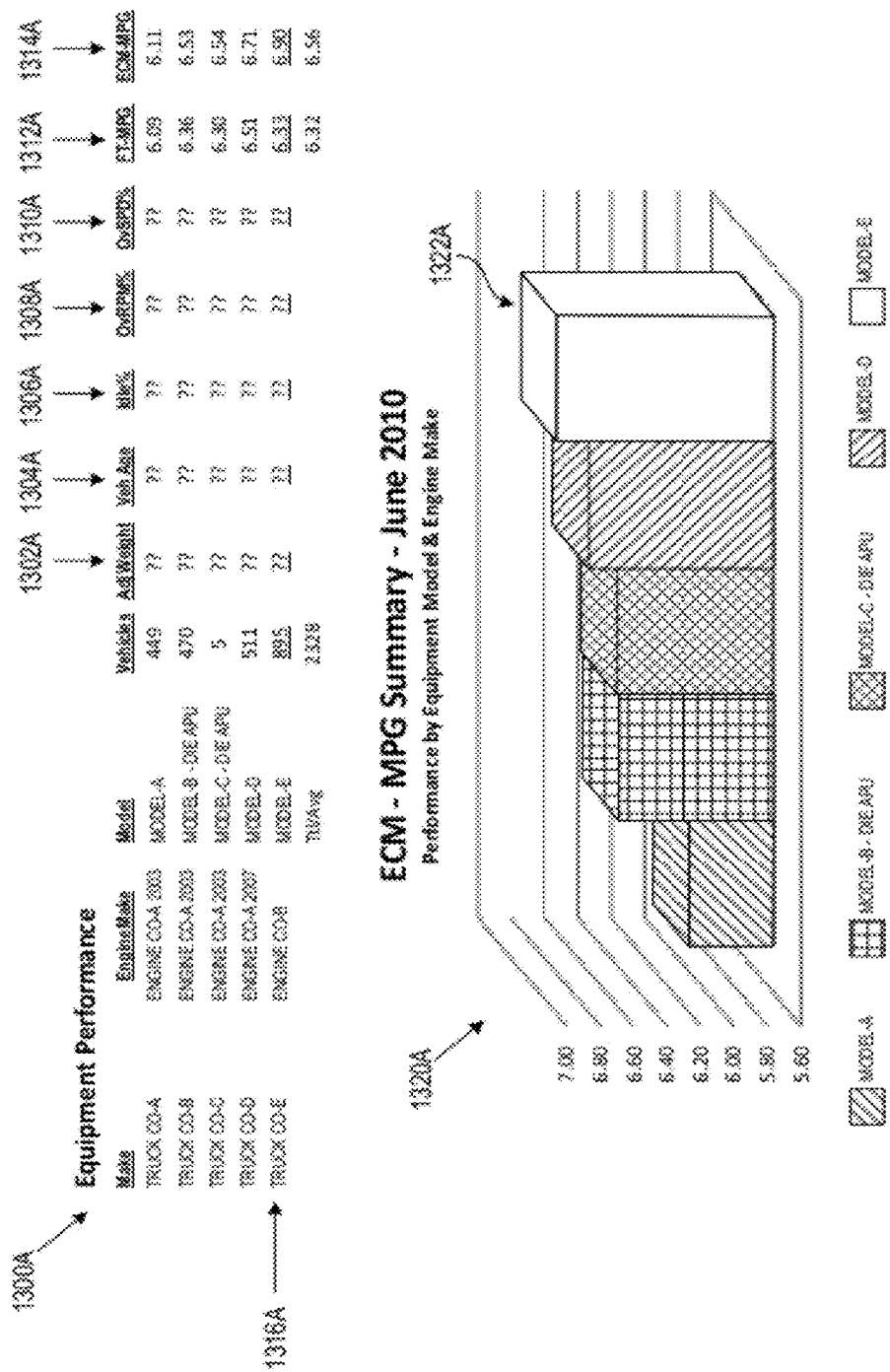
FIGS. 13A and 13B depict a comparative analysis that illustrates the impact of performance factors.

Another representative analysis shown in FIG. 4 relates to normalized vehicle performance analysis 444. This analysis can determine net fuel economy without regard to driver and environmental factors, and therefore relates to relative equipment type performance. In particular, FIG. 13A depicts a graphical manner of applying data models in accordance with the invention. The table 1300A lists various truck makes, engine makes and models for five equipment groupings. Information such as adjusted weight 1302A, vehicle age 1304A, idle % 1306A, over-RPM 1308A and over-speed 1310A are not taken into account in the first analysis shown in FIG. 13A. Focusing on one of vehicle categories 1316A, this equipment category has an ECM MPG 1314A of 6.90 MPG and a physical fuel 1312A calculation of 6.33 MPG. As shown on the graph 1320A, this particular "model-E" equipment category 1322A appears to have the highest miles per gallon of its listed peers.

Figure 13B:
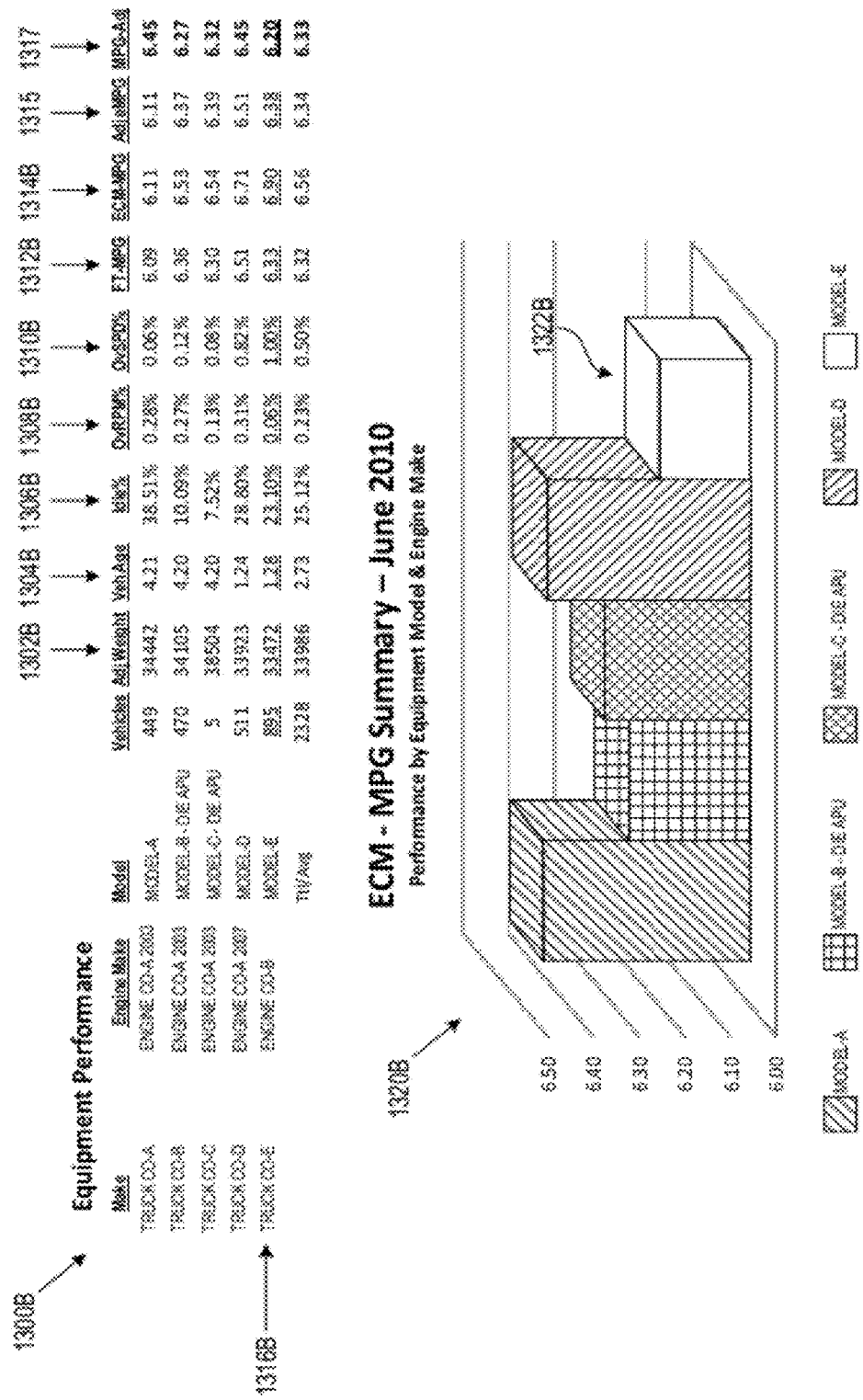

However, the results change significantly when factors impacting equipment performance are taken into consideration using modeling as described herein. This is depicted in FIG. 13B, where the table 1300B has been populated with weight 1302B, age 1304B, idle % 1306B, over-RPM 1308B, over-speed 1310B, fuel tax/physical MPG 1312B, ECM MPG 1314B, adjusted ECM MPG 1315, and an adjusted model MPG 1317. Referring again to vehicle category 1316B, it can be seen that the factors significantly impacted the MPG, which is shown as 6.20 MPG. Thus, the equipment that appeared to be the top performer in FIG. 13A turns out to be the worst performer relative to its listed peers in FIG. 13B. By considering the performance factors 1302B-1310B for each of the vehicles, this essentially provides a normalized baseline that facilitates comparison of the equipment without consideration of other variables that will most likely differ in the use of each respective piece of equipment. For example, comparing two like trucks with the same engine cannot provide a reliable result if one of the trucks is three years older, carried 15,000 pounds more, and had a speedy driver relative to the other truck. In this example, application of the model removes the variables to enable the comparison that is actually desired.

As noted at the user interface phase 446 of FIG. 4, various presentations of models, analyses, and/or other collections of data are supported. In one embodiment, the operations view 450 and fleet view 452 represent what is made available via a website or other electronic mechanism, whereas the reports 454 represents printed reports of such information. Reports and online information may be presented in forms corresponding to FIGS. 10-13B. Some reports, such as those presented via the fleet view 452, may provide organized data that has not undergone modeling or other analysis. FIG. 14 is an example of such a report 1400, which presents a representative fuel tax summary.

Figure 15:
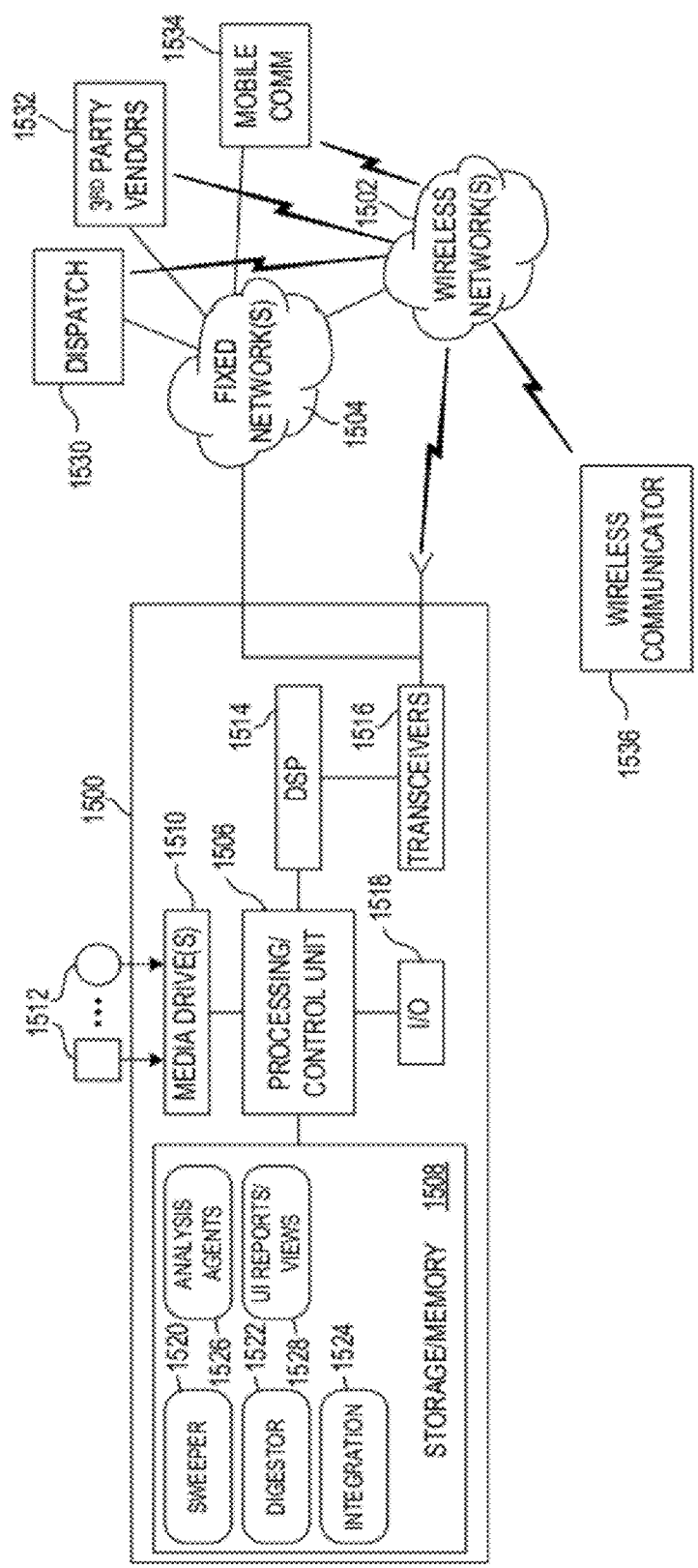
FIG. 15 illustrates a representative processing system that may be used in connection with the techniques described herein.

FIG. 15 illustrates a representative processing system 1500 that may be used in connection with the techniques described herein. The system 1500 may represent one or more servers or other computing devices capable of processing data, receiving and otherwise communicating data to be processed, user interface capabilities, website hosting capabilities, etc. The system 1500 can communicate over one or more networks, such as the wireless network(s) 1502 and/or fixed network(s) 1504. The system 1500 may be a single system or a distributed system.

The illustrated processing/computing system 1500 includes a processing arrangement 1506, such as one or more processors, which are coupled to the storage/memory 1508. The processor 1506 carries out a variety of standard computing functions as is known in the art, as dictated by software and/or firmware instructions. The storage/memory 1508 may represent firmware, read-only memory (ROM), memory (e.g. RAM), media storage, etc. The computing system 1500 may also include media drives 1510, such as hard and floppy disk drives, CD-ROM drives, DVD drives, and other media 1512 capable of reading and/or storing information. In one embodiment, software for carrying out the operations at the computing system 1500 may be stored and distributed on CD-ROM, diskette, magnetic media, removable memory, or other form of media capable of portably storing information, as represented by media devices 1512. Such software may also be transmitted to the system 1500 via data signals, such as being downloaded electronically via a network such as the data network 1504, Local Area Network (LAN) (not shown), wireless network 1502, and/or any combination thereof.

The illustrated computing system 1500 may also include DSP circuitry 1514, and at least one transceiver 1516 (which is intended to also refer to discrete transmitter/receiver components). The computing system 1500 and transceiver(s) 1516 may be configured to communicate with one or both of the fixed network 1504 and wireless network 1502. The processor 1506 may be coupled to input/output circuitry 1518 to enable connections to external devices such as user input devices, display modules, etc.

The storage/memory 1508 and/or media devices 1512 store the various programs and data used in connection with the present invention. For example, programs for carrying out operations described herein may be stored in the storage/memory 1508. For example, functionality described in connection with FIG. 4 such as the sweeper 400, digestor 406, integration 416, analysis agents 434 and user interface (UI) 446 may have corresponding software modules 1520, 1522, 1524, 1526, 1528 in the storage 1508. These and other software modules are executed under the control of the processor 1506 to perform functions described herein.

The computing system 1500 communicates with external data sources to obtain data for purposes of creating and using models. Such data sources can communicate with the system 1500 via wired or wireless interfaces. Representative sources of data were previously described, and also shown in FIG. 15. Dispatch 1530, 3rd party vendors 1532 such as fuel vendors, and mobile communication companies 1534 can communicate with the system 1500 via wired or wireless interfaces. Additionally, onboard communication and computing devices equipped in the trucks or other vehicles can communicate their data wirelessly. For example, the wireless communicator 1536 represents an onboard computer in a vehicle that is capable of transmitting and/or receiving information such as data call records, by which vehicle-related information can be provided. For example, ECM or other electronic engine data can be provided from vehicles to the processing system 1500 by way of an onboard computing device serving as the wireless communicator 1536 having wireless communication capabilities such as cellular, satellite, etc.

Hardware, firmware, software or a combination thereof may be used to perform the functions and operations described herein. Using the foregoing specification, some embodiments of the invention may be implemented as a machine, process, or article of manufacture by using standard programming and/or engineering techniques to produce programming software, firmware, hardware or any combination thereof. Any resulting program(s), having computer-readable program code, may be embodied within one or more computer-usable media such as memory devices or transmitting devices, thereby making a computer program product, computer-readable medium, or other article of manufacture according to the invention. As such, the terms "computer-readable medium," "computer program product," or other analogous language are intended to encompass a computer program existing permanently, temporarily, or transitorily on any computer-usable medium such as on any memory device or in any transmitting device.

From the description provided herein, those skilled in the art are readily able to combine software created as described with appropriate general purpose or special purpose computer hardware to create a computing system and/or computing subcomponents embodying the invention, and to create a computing system(s) and/or computing subcomponents for carrying out the method(s) of the invention.

It is to be understood that even though numerous characteristics of various embodiments have been set forth in the foregoing description, together with details of the structure and function of various embodiments, this detailed description is illustrative only, and changes may be made in detail, especially in matters of structure and arrangements of parts illustrated by the various embodiments to the full extent indicated by the broad general meaning of the terms in which the appended claims are expressed.

What is claimed is:

1. A method comprising:
    defining a set of fuel consumption performance factors having a potential to impact vehicle fuel economy;
    receiving, by a processor coupled to storage, a plurality of the fuel consumption performance factors including actual vehicle operational data from at least one of an engine control module and an onboard event recorder, and identifying categorical variables from at least a subset of the plurality of the fuel consumption performance factors to create one or more categorical groupings;
    processing, by the processor, the fuel consumption performance factors associated with at least one of the categorical groupings to identify a hypothetical maximum fuel economy for the at least one of the categorical groupings, and to identify one or more fuel economy deduction coefficients based on the fuel consumption performance factors that adversely impact the hypothetical maximum fuel economy;
    creating, by the processor, a model based on the hypothetical maximum fuel economy and the one or more fuel economy deduction coefficients to predict fuel economy for vehicles in the at least one of the categorical groupings; and
    generating, by the processor, an output comprising the hypothetical maximum fuel economy and the predicted fuel economy for vehicles in the at least one of the categorical groupings.

2. The method of claim 1, further comprising applying the model to a set of the fuel consumption performance factors relating to a particular vehicle to determine whether the vehicle had an unexpected volume of fuel in its fuel tank relative to an expected volume of fuel based on the predicted fuel economy.

3. The method of claim 2, wherein the expected volume of fuel is greater than the unexpected volume of fuel indicative of potential fuel theft.

4. The method of claim 2, wherein the expected volume of fuel is less than the unexpected volume of fuel.

5. The method of claim 1, further comprising applying the model to a set of the fuel consumption performance factors specific to each of a plurality of different equipment types to diminish an impact of differing ones of the fuel consumption performance factors on a comparison of the equipment types.

6. The method of claim 1, further comprising applying the model to a set of the fuel consumption performance factors to obtain a predicted fuel economy for a particular vehicle, and comparing the predicted fuel economy to an actual fuel economy for the particular vehicle to determine if the vehicle is underperforming relative to the predicted fuel economy.

7. The method of claim 1, wherein:
    one of the fuel consumption performance factors comprises an idle time percentage;
    the one or more fuel economy deduction coefficients comprises an idle time deduction coefficient;
    creating the model comprises creating the model based on the hypothetical maximum fuel economy and the idle time deduction coefficient to predict fuel economy for vehicles in the at least one of the categorical groupings; and
    further comprising applying the model to a particular vehicle's idle time percentage to identify a deviation of the particular vehicle's fuel economy from the predicted fuel economy as a result of the particular vehicle's idle time percentage.

8. The method of claim 1, wherein:
    one of the fuel consumption performance factors comprises an over-RPM percentage;
    the one or more fuel economy deduction coefficients comprises an over-RPM deduction coefficient;
    creating the model comprises creating the model based on the hypothetical maximum fuel economy and the over-RPM deduction coefficient to predict fuel economy for vehicles in the at least one of the categorical groupings; and
    further comprising applying the model to a particular vehicle's over-RPM percentage to identify a deviation of the particular vehicle's fuel economy from the predicted fuel economy as a result of the particular vehicle's over-RPM percentage.

9. The method of claim 1, wherein:
one of the fuel consumption performance factors comprises an over-speed percentage;
the one or more fuel economy deduction coefficients comprises an over-speed deduction coefficient;
creating the model comprises creating the model based on the hypothetical maximum fuel economy and the over-speed deduction coefficient to predict fuel economy for vehicles in the at least one of the categorical groupings; and
further comprising applying the model to a particular vehicle's over-speed percentage to identify a deviation of the particular vehicle's fuel economy from the predicted fuel economy as a result of the particular vehicle's over-speed percentage.

10. The method of claim 1, wherein the fuel consumption performance factors comprise driver-related performance factors.

11. The method of claim 10, wherein the driver-related performance factors are selected from the group comprising an over-speed percentage, an over-RPM percentage, an idle time percentage, an out-of-route indication, and a hard braking rate.

12. The method of claim 1, wherein the fuel consumption performance factors comprise equipment-related performance factors.

13. The method of claim 12, wherein the equipment-related performance factors are selected from the group comprising a manufacturer, a manufacturer's model, an engine type, a model year, a trailer type, and an APU indication.

14. The method of claim 1, wherein the fuel consumption performance factors are selected from the group comprising a load weight, an empty/loaded status, a stop frequency rate, and an urban/rural geographic percentage.

15. The method of claim 1, wherein the fuel consumption performance factors comprise environmental-related performance factors, and wherein the environmental-related factors are selected from the group comprising topography, an air temperature where the vehicle travels, and a road type.

16. The method of claim 1, further comprising generating reports relating to the application of the model to a set of the fuel consumption performance factors.

17. An apparatus comprising:
at least one transceiver configured to receive data concerning vehicle actions impacting fuel economy from a vehicle communication device;
a processor;
storage coupled to the processor, comprising:
a data input module executable by the processor and configured to receive and parse the received data;
a data integration module executable by the processor and configured to prepare the received data for processing;
a data modeling module executable by the processor and configured to create data models based on the prepared data to arrive at a predictive fuel consumption rate based on factors obtained from the prepared data, the data modeling module using a model based on a hypothetical maximum fuel economy and one or more fuel economy deduction coefficients to arrive at the predictive fuel consumption rate;
an analysis model executable by the processor and configured to apply the data models to provide analyses of predicted fuel consumption versus actual fuel consumption in view of the data models; and
an output device configured to generate an output comprising results of the analyses of predicted fuel consumption versus actual fuel consumption.

18. The apparatus of claim 17, wherein the at least one transceiver is configured to receive the data from data sources including any one or more of a dispatch software platform, fuel vendor, and mobile communications vendor.

19. A method comprising:
identifying fuel consumption impacting factors for a category of vehicles;
calculating, by a processor coupled to storage, a predicted fuel consumption for a particular vehicle in the category of vehicles based on the identified fuel consumption impacting factors, the processor calculating the predicted fuel consumption for the particular vehicle using a model based on a hypothetical maximum fuel economy and one or more fuel economy deduction coefficients;
receiving, via one or more transceivers, actual vehicle operational data for the particular vehicle from at least one of an engine control module and an onboard event recorder;
calculating, by the processor, an actual fuel consumption for the particular vehicle based on the collected actual vehicle operational data;
comparing, by the processor, the calculated actual fuel consumption and the predicted fuel consumption; and
generating, by an output device, an output comprising the predicted fuel consumption and the calculated actual fuel consumption for the vehicle.

* * * * *